(12) United States Patent
Koike et al.

(10) Patent No.: US 7,194,678 B1
(45) Date of Patent: Mar. 20, 2007

(54) DYNAMIC WEB PAGE GENERATION METHOD AND SYSTEM

(75) Inventors: Hiroshi Koike, Maebashi (JP); Nobuya Okayama, Kawasaki (JP); Miyoko Namioka, Yokohama (JP); Tetsuya Masuishi, Machida (JP); Shigetoshi Hayashi, Fujisawa (JP); Kouichi Shimasaki, Yokohama (JP); Yuuichi Yoshida, Yokohama (JP); Kumiko Igawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/516,699

(22) Filed: Mar. 1, 2000

(30) Foreign Application Priority Data

Mar. 2, 1999 (JP) .................................. 11-053615

(51) Int. Cl.
*G06F 17/24* (2006.01)
*G06F 17/27* (2006.01)

(52) U.S. Cl. ..................... 715/511; 715/517; 715/530; 709/203; 709/223; 709/224

(58) Field of Classification Search ................ 715/530, 715/501.1, 517; 709/203, 223–224; 718/511
See application file for complete search history.

(56) References Cited

U.S. PATENT DOCUMENTS

| | | | | |
|---|---|---|---|---|
| 5,928,323 | A * | 7/1999 | Gosling et al. | 709/203 |
| 6,038,598 | A * | 3/2000 | Danneels | 709/219 |
| 6,182,113 | B1 * | 1/2001 | Narayanaswami | 709/203 |
| 6,269,275 | B1 * | 7/2001 | Slade | 700/90 |
| 6,356,903 | B1 * | 3/2002 | Baxter et al. | 707/10 |
| 6,415,335 | B1 * | 7/2002 | Lowery et al. | 710/5 |
| 2002/0107946 | A1 * | 8/2002 | Albers | 709/223 |
| 2002/0147788 | A1 * | 10/2002 | Nguyen | 709/217 |

FOREIGN PATENT DOCUMENTS

| | | |
|---|---|---|
| JP | 8-022498 | 1/1996 |
| JP | 9-26970 | 1/1997 |
| JP | 9-330360 | 12/1997 |
| JP | 10-240823 | 9/1998 |
| JP | 11-167584 | 6/1999 |

OTHER PUBLICATIONS

Microsoft Corpartion, Microsoft Press Computer Dictionary, 1997, Microsoft Press, Third Edition, p. 387.*
(Japanese Article) "WWW Interactive and Read-Ahead System Design and Package," *Computer Software*, pp. 48-61, vol. 15, No. 1 (1998).
(Japanese Article) Chapter 3 entitled "First XML," *Nikkei BP Publication* (1997) pp. 67-112.

* cited by examiner

*Primary Examiner*—Stephen Hong
*Assistant Examiner*—Joshua D Campbell
(74) *Attorney, Agent, or Firm*—Knoble Yoshida & Dunleavy, LLC

(57) ABSTRACT

In comparison to unnecessary page generation of the prior art, the page generation time according to the current invention is substantially reduced, and the generated page is efficiently accessed. Since in response to at least one of a predetermined set of update events, a page is dynamically generated in advance of a user page request and the dynamically generated page is stored, the current invention allows the efficient page access. The efficient page access is accomplished by storing the dynamically generated page as a static page at a URL identified by a page access call with an argument. Thus, the user accesses the previously generated dynamic page at a high-speed. The use of the prior art technologies such as proxy servers in combination further improves the cost of transmission of the page to the user according to the current invention.

40 Claims, 21 Drawing Sheets

FIG. 9

BATCH PAGE
GENERATION DEFINITIONS 70

| ID. | TRIGGER TYPE | TRIGGERING CONDITIONS | BATCH PAGE GENERATION COMMAND | GENERATED PAGE NAME |
|---|---|---|---|---|
| 1) | TIME | EVERY 6 AM | page TEMPLATE = c. html | c_g_.html |
| 2) | DATA UPDATE | UPDATE ON PRODUCT A | page TEMPLATE = a. html & ITEM = 1000a | a_g_100a.html |
| 3) | TEMPLATE UPDATE | a. html UPDATE | page TEMPLATE = a. html & ITEM = * | a_g_*.html |
| 4) | | ...... | | |

```
                                                                    4000A
<HTML>
<head> <title> Product Search Page <title> <head>        40001
<BODY>
<!@EXEC INTERFACE=PDBManager=Get Anchor
PARAM=("STORE D PRODUCT D PRODUCT NAME MANUFACTURER PRICE MANUFACTURER ???? RETAIL SUGGESTED PRICE KEYWORD
       $CONDITION", "KEYWORD", 0, 0, 1, 3)
RECORD=REC>
<CENTER>                                                            40002
<B><FONT COLOR="#3333FE"><H1>PRODUCT SEARCH</H1></FONT></B>
<b>No OF SEARCHED ITEMS $COUNT </b><br>
<table border="5" cellpadding=" 3" cellspacing="0">
        <tr>       <td width =20%>
                   <h4><b>selected item</b></h4>
                   </td>
                   <td width=80% align="center">                    40004
                   <h4><b>selecting candidates</b></h4>
                   <td>                                  40003
        </tr><tr>
                   <td width>.<b4><b>classification</b></h4> </td>
                   <td> | <!@EXEC INTERFACE=PDBManager METHOD=Get Anchor
                       PARAM=(CLASSIFICATION", "$CONDITION", "$KEYWORD", 1, "Large Classification", 0, 0, 1, 1>
                       RECORD=REC>
                        <!@REPEAT RECORD=REC>
                           <A herf="/cgi-bin/page?SHOP ID=$SHOP ID&TEMPLATE=mcsearchmain.html
                              &KEYWORD=<#ENCODE($KEYWORD)>&CONDITION=<#ENCODE($NCOND)>">
                           $VALUE</A>
                        <!/REPEAT>
                   </td>
                                                          40007  40006   40005
        </tr><tr>
                   <td width>.<h4><b>sub classificationi</b></h4> </td>
                   <td> | <!@EXEC INTERFACE=PDBManageer METHOD=GetAnchor
                       PARAM=("Small Classification", "CONDITION", "$KEYWORD", 1, "Small Classification", 0, 0, 1, 1)
                       RECORD=REC>
                        <!@REPEAT RECORD REC>
                           <A herf="/cgi-bin/page?SHOP ID=$SHOP ID&TEMPLATE=mcsearchmain.html
                              &KEYWORD=<#ENCODE($KEYWORD)>&CONDITION=<#ENCODE($NCOND)>">
                           $VALUE</A>
                        <!/REPEAT>
                   </td>
        </tr><tr>
                   <td><h4><b>Price(?)</b></h4>                                </td>
                   <td> <!@EXEC INTERFACE=PDBManager METHOD=Get Anchor
                       PARAM=("PRICE", "$CONDITION", "$KEYWORD", 2, "PRICE", 0, 0, 1, 2>
                       RECORD=REC>
                        <!@REPEAT RECORD REC>
                           <A herf="/cgi-bin/page?SHOP ID=$SHOP ID&TEMPLATE=mcsearchmain.html
                              &KEYWORD=<#ENCODE($KEYWORD)>&CONDITION=<#ENCODE($NCOND)>">
                           $VALUE1 ~ $VALUE2</A>
                        <!/REPEAT>
                   </td>
        <tr>
</table>
</center>
</body>
</html>
```

FIG. 11

```
<HTML>
<head> <title>PRODUCT SEARCH PAGE</title> </head>

<BODY>
<CENTER>
<B><FONT COLOR="#3333FF"><H1>PRODUCT SEARCH</H1><FONT></B>
<b>No. OF SEARCHED ITEMS 184 </b><br>

<table border="5" cellpadding="3" cellspacing="0"
        <tr>    <td width=20%>
                <h4><b>SELECTION </B></H4>
                <td>
                <td width=80% align="center">
                <h4><b>Selection Candidates</b></h4>
                </td>
        </tr> <tr>
                <td>
                <h4><b>classification</b></h4>
                </td>
                <td>
                   <A herf="/cgi-bin/page?SHOP ID=a-SHOP ID&TEMPLATE=mcsearchmain.html
                       &KEYWORD=&CONDITION=%91%E5%95%AA%97%DE+
                       =+%27PDF%95%B6%8F%91?">
                   TEXT </A>
                   <A herf="/cgi-bin/page?SHOP ID=a-SHOP ID&TEMPLATE=mcsearchmain.html
                       &KEYWORD=&CONDITION=%91%E5%95%AA%97%DE+
                       =+%27%83v%83%8A%83y%83C%83h%83J%81%5B%83h%27">
                   VOIA </A>
                   <A herf="/cgi-bin/page?SHOP ID=a-SHOP ID&TEMPLATE=mcsearchmain.html
                       &KEYWORD=&CONDITION=%91%E5%95%AA%97%DE+
                       =+%27%89%E6%91%9C%27">
                   IMAGE </A>
                   <A herf="/cgi-bin/page?SHOP ID=a-SHOP ID&TEMPLATE=mcsearchmain.html
                       &KEYWORD=&CONDITION=%91%E5%95%AA%97%DE+
                       =+%27%93%AE%89%E6%27">
                   ANIMATION </A>
                </td>
        </tr>
              ...  ....
```

FIG. 12

PRODUCT SEARCH

NO. OF SEARCHED ITEMS 184

| SELECTION | SELECTION CANDIDATE | | | | | | | | |
|---|---|---|---|---|---|---|---|---|---|
| CLASSIFICATION | TEXT | VOICE | IMAGE | ANIMATION | | | | | |
| SUB CLASSIFICATION | APPLE AUTOMOBILE | CLASSICS ANIMAL | SOUND TRACK | PUZZLE | POPULAR | EUROPE | ROCH | FLOWERS | BACKGROUND MUSIC |
| SUGGESTED RETAIL PRICE (YEN) | 0 ~ 49 | 50 ~ 99 | 100 ~ 299 | 300 ~ 499 | 500 ~ 4999 | 5000 ~ 9999 | | | |

PRODUCT DATA TABLE

| PRODUCT I.D. | STORE I.D. | PRODUCT NAME | MANUFACTURER | PRICE | MEMBER PRICE | IMAGE | DESCRIPTION |
|---|---|---|---|---|---|---|---|
| ... | | | | | | | |
| 1000a | AA | CHRISTMAS DINNER CERTIFICATE | XX | 30000 | 25000 | PP.gif | CHRISTMAS |
| 1000b | BB | CHRISTMAS CAKE | YY | 4000 | 3800 | PI.gif | SHEET CAKE |
| ... | | | | | | | |

61 / 1000a
62 / 1000b

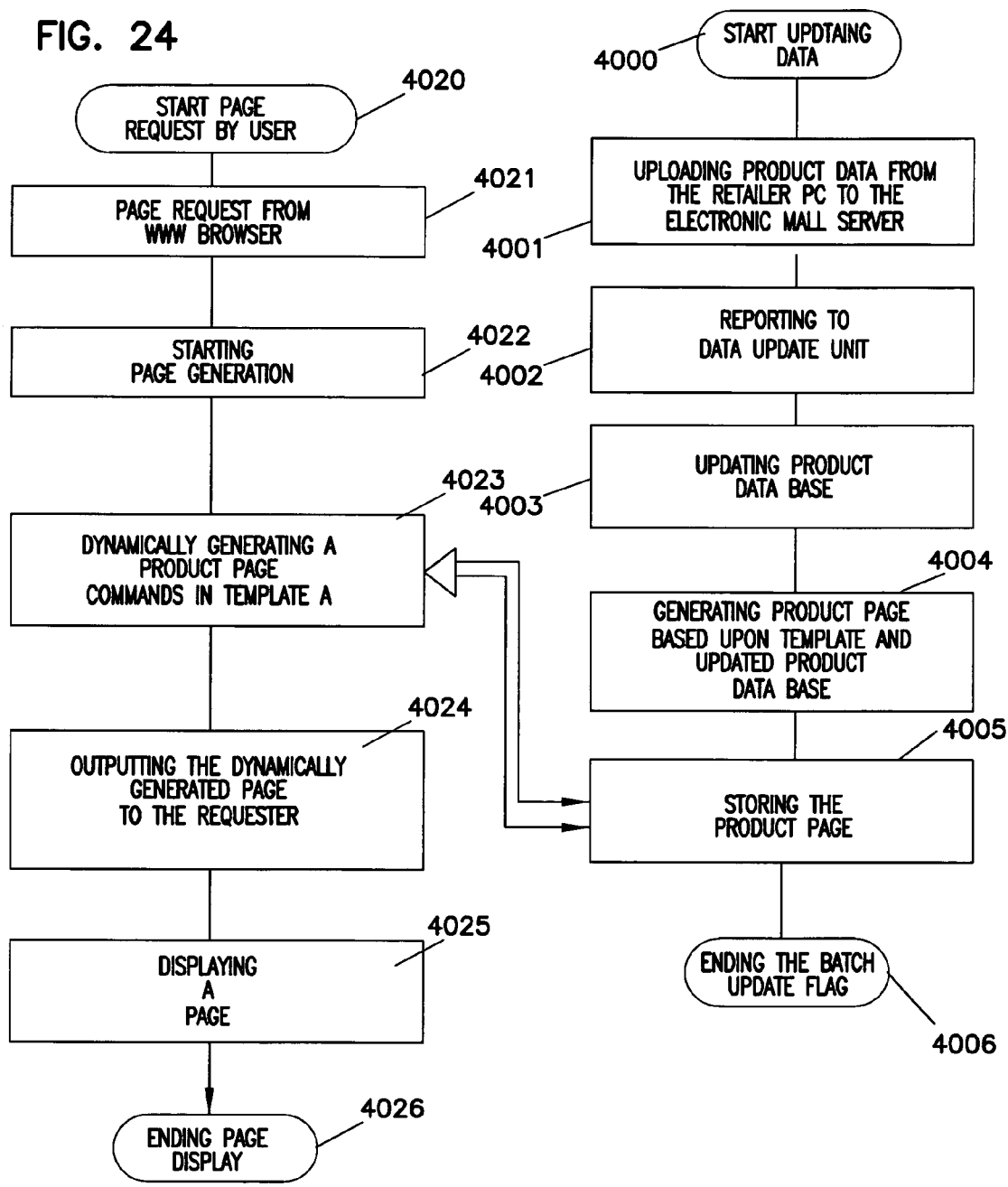

DYNAMIC WEB PAGE GENERATION METHOD AND SYSTEM

FIELD OF THE INVENTION

The current invention is generally related to dynamic web page generation, and more particularly related to an automatic web page generation technique in response to a set of predetermined events.

BACKGROUND OF THE INVENTION

The access method is widely used to down load Web pages based upon the Hypertext Markup Language (HTML) or the Extensible Markup Language (XML) to client personal computers (PC) through the world-wide web (www) or the Internet. In the conventional high-speed access methods, cash is primary used to maintain the fixed or static web pages close to the client computers. These techniques are designed to substantially reduce the cost of transmitting the pages to the client computers. On the other hand, to accommodate varied demands, a www page generation technique dynamically generates web pages based upon the requests and users at a www server site. The dynamic web pages are used, for example, in a catalogue in electronic commerce or E-commerce. The dynamic page generation method involves the costs associated with the page generation and the transmission of the pages to the clients.

The web pages include information to generate the client's display screen. In other words, in the www system, it is a unit of information which is specified by an address or Universal Resource Locator (URL) and is to be displayed via a www browser. The web page information includes text data in the HTML or in the XML, and graphics data in the Graphics Interchange Format (GIF) or in the Joint Photographic Experts Group (JPEG) format. The term, page can be also used outside the www system, and it means information which is locally shown on the client PC screen.

To further illustrate the prior art page access or generation techniques, some examples are described below. For example, an article entitled, "WWW Interactive and Read-Ahead System Design and Package," Computer Software, Pp. 48–61, Vol. 15, No 2 (1998) discloses a technique to transmit a user site a static page in response to a user page request and that the static page is previously authored using an editor such as a HTML authoring tool. FIG. 1 shows an exemplary conventional access method of the static Web pages. An author generates static pages 90 and stores them in a server 11. A user sends the server 11 a down-load request for one or more of the stored static Web pages 90 via a browser 35 through a network 2. In response to the download request, the server 11 downloads the browser 35 the requested Web pages to the user via network 2. The static Web pages cannot be customized according to user information and or user requests.

Now referring to FIG. 2, another prior art page access technique involves a proxy server 40, which is a system cash for cashing requested static page 90 into cashed page 91 from a server 22 in response to a user request via a browser 35 through a network 2. Later, in response to a request to the same cashed page 91 in the proxy server 40, the proxy server 40 inquires the server 22 whether or not the cashed information 91 has been updated at the server site 22 since the last cashing operation. If there has not been any update on the requested static page 90, the page access technique reuses the cashed page 91 via the proxy server 40. The above Computer Software article discloses the proxy based page access technique. In summary, the proxy based page access technique reduces a number of transmissions of the static web pages from the www server 22. To a heavy-access client, a copy of the cashed pages is sent from the most closely situated proxy server so as to process the page requests in a high-speed. In certain embodiments, the proxy server resides within the browser. As described above, the static Web pages cannot be customized according to user information and or user requests.

FIG. 3 illustrates a prior art push access technique. An example of the push access technique includes Microsoft's Active Channel. A push server 94 has a push a push definition such as in the Channel Definition Format (CDF). A push client 93 receives the push definition 95 and downloads the web pages 95 from the push server 94 into a client local cash 97 based upon the CDF in response to a client's time trigger which is asynchronous with the user page request. In other words, the web page is transparently downloaded to the push client server 93 from the push server 94 without the user intervention. The CDF specifies not only the web pages to be distributed or downloaded but also a distribution time. The push client server 93 locally processes the user page request and returns the locally cashed page 97 to the user if the user page request specifies the locally cashed pages 97. Because of the access to the client rather than the server, the push access technique is advantageously high-speed. Chapter 3 of "First XML," Nikkei BP Publication (1997) discloses the above described push access technique.

Still referring to FIG. 3, despite the above described features, the push access technique has the following disadvantages. While the push access technique enables the push client server 93 to perform high-speed access, the push client server 93 is unable to interactively download the information from the push server 94. To customize the information, the push server 94 must generate and store various versions of the static web page information. Furthermore, the CDF must be individually customized to correspond to the various versions of the static web pages. As described above, the static Web pages cannot be customized according to user information and or user requests.

Now referring to FIG. 4, another prior art example of an efficient page access technique includes the read-ahead technique that is also disclosed in the above Computer Software article. The read-ahead techniques are further grouped into an association type and a statistic type. The association type read-ahead technique scans a content of the static web page 90 that has been transmitted from the www server 11 in response to an initial user request via a www browser 35 via a network 2. Based upon the scanned web page 90 and a predetermined set of rules, a next-page analysis unit 98 determines other associated web pages that may be subsequently requested, and a batch page calling unit 99 reads ahead these associated web pages into a cash 91 in a proxy server 40 via the network 2 independent of the user request. If the subsequent user request indeed specifies the read-ahead web pages in the cash 91, the www browser 35 has a high-speed access to the static web pages in the cash 91 for displaying the web page information. In summary, the association type read-ahead technique saves the download time from the remote server 11 and stores the web pages in the local cash 91 in the proxy server 40 in advance of the user requests. The static read-ahead web pages in the cash 91 are shared among users whose www browsers 35 share the proxy server 48. As described above, the static Web pages cannot be customized according to user information and or user requests.

Still referring to FIG. 4, the statistic type read-ahead technique is generally similar to the above described association type read-ahead technique except that the next-page analysis unit 98 statistically processes the scanned web page and determines other associated web pages that may be subsequently requested based upon statistics. Unfortunately, the statistic type read-ahead technique increases the traffic and the benefit of the local cash is marginal. The subsequent web page requests often end up downloading the requested pages 90 from the www server 11 rather than the cash 91 in the proxy server 40.

To customize web pages according to user information and or user requests, referring to FIG. 5, a common gate way interface (CGI) is illustrated. In general, in response to a user request via a www browser 35 and a network, a page generation unit 23 in a www server 11 generates a page 82 from data 22 and a template 23A. In particular, the page generation unit 23 dynamically generates a HTML page 92 by inserting certain data from the data 22 into the HTML template 23A according to a processing script in the template. The www server 11 transmits the generated HTML page 92 back to the www browser 35 via the network 2 for displaying the information in the HTML page 82. Specifically, the Japanese Patent Publications 8-22498 and 9-26970 respectively disclose a search engine for an item in a virtual shopping mall and the dynamically customized www page generation. Using the above exemplary shopping environment, the user specifies a specific one of the templates 23A, and the page generation unit 23 dynamically generates a specific shopping catalogue for each user request based upon the specified template 23A and associated data from the data base 22. In contrast to the above described conventional static web page per item, since the dynamic pages allow the author of the web pages to substantially reduce the development effort, the cost associated with the web page development is also substantially reduced. Furthermore, the dynamic page generation advantageously enables the generation of a web page that contains information such as a user name which is not available in advance of the user request. On the other hand, for each access, the dynamic web page generation requires a certain amount of time to get necessary data, to analyze the template and to generate a web page.

In summary, the above described conventional static and dynamic web page access techniques pose problems for the current need for accessing the web pages. On one hand, although the static web page access techniques allows high-speed access, these conventional techniques fail to accomplish customization of the web pages according to user information and or user requests. On the other hand, although the conventional dynamic web page generation technique allows customization of the web pages according to user information and or user requests, the conventional dynamic generation technique is incapable of high-speed access. The conventional dynamic web page generation techniques unnecessarily generates the same page when multiple page generation requests for the same page are issued by a plurality of users. The server resources are wasted on the unnecessarily repeated web page generation. Let alone, the conventional dynamic web page generation techniques do not generally take advantage of the proxy server.

SUMMARY OF THE INVENTION

In order to solve the above and other problems, according to a first aspect of the current invention, including a method of a page generation/access, including generating a dynamic page based upon a page template and a page generation call with an argument in response to a user page access request including the page generation call with the argument; storing in a batch page generation definition table a unique file name of the generated dynamic page in association with a page update trigger, the page generation call of the dynamic page, the unique file name containing an element corresponding to the argument; storing the generated dynamic page in a storage device at a location specified by the unique file name; updating the generated dynamic page stored in the storage device by generating and storing an updated dynamic page according to the file name stored in the table and based upon the page template and the page generation call with the argument stored in the table in association with the upgrade trigger in response to at least one of predetermined page update events in advance of another user page access request; and outputting the stored dynamic page as updated in the step d)and in response to another one of the user page access request, the user page access request, containing a page generation call with an argument stored in the table in association with a file name corresponding to the outputted dynamic page.

According to a second aspect of the current invention, a system for generating and accessing a page, including a system for generating and accessing a page, including: a batch page generation control unit for determining a dynamic page to be generated in response to at least one of a predetermined set of page update events; a batch page generation unit connected to the batch page generation control unit for generating the dynamic page based upon a page template and a page generation call with an argument in response to a user page access request including the page generation call with the argument; a memory unit connected to the batch page generation unit for storing in a batch page generation definition table a unique file name of the generated dynamic page in association with a page update trigger, and the page generation call of the dynamic page; the memory unit storing the generated dynamic page in a storage device at a location specified by the unique file name, the batch generation unit updating the generated dynamic page stored in the storage device by generating and storing an updated dynamic page according to the file name stored in the table and based upon the page template and the page generation call with the argument stored in the table in association with the page update trigger in response to at least one of predetermined page update events in advance of another user page access request; and an output unit connected to the memory unit for outputting one of the stored dynamic page and the additional dynamic page in response to the user page access request, the user page access request containing a page generation call with an argument stored in the table in association with a file name corresponding to the outputted dynamic page.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 9 illustrates one example of batch page generation definitions used in the preferred process of dynamically generating WWW pages according to the current invention.

FIG. 10 shows an exemplary template which is used in the preferred process of dynamically generating WWW pages according to the current invention.

FIG. 11 shows an exemplary page that was generated from the template of FIG. 10 and the searched data as the page was dynamically generated according to the current invention.

FIG. 12 illustrate an exemplary display output generated by a browser according to the HTML of FIG. 11.

FIG. 14 illustrates an exemplary product data table.

FIG. 24 is a flow chart illustrating acts involved in the exemplary use of a preferred process of dynamically generating WWW pages and accessing the dynamically generated WWW pages at a high-speed access according to the current invention.

DETAILED DESCRIPTION OF THE PREFERRED EMBODIMENT(S)

Figure 6:
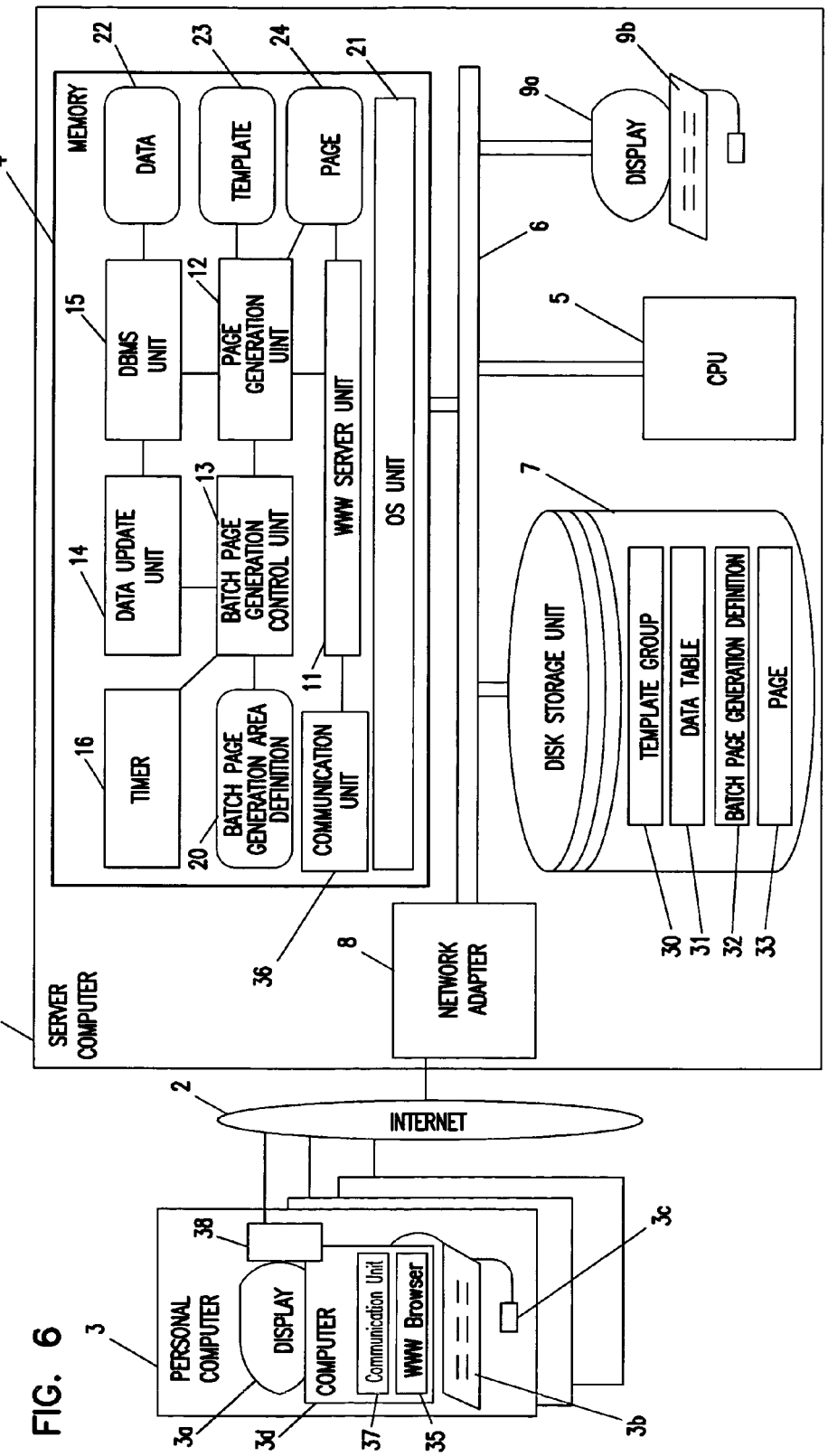
FIG. 6 is a block diagram illustrating one preferred embodiment of the high-speed dynamic page generation system according to the current invention.

Referring now to the drawings, wherein like reference numerals designate corresponding structures throughout the views, and referring in particular to FIG. 6, a block diagram illustrates one preferred embodiment of the high-speed dynamic page generation system according to the current invention. The preferred embodiment includes a server or a server computer 1, a client or a client personal computer (PC) 3, and a network 2 that connects the server 1 and the client 3 via the Internet and Intranet. The client PC 3 further includes a central processing unit (CPU) 3d, a network adapter 38, an output device such as a display unit 3a as well as an input device such as a keyboard 3b and a mouse 3c. The CPU 3d executes software instructions such as a communication unit 37 and a world-wide web (WWW) browser 35. Using the input devices 3b and 3c, the user requests a world-wide web (WWW) page within the WWW browser 35, and the client PC 3 formulates a WWW page request to the server 1. In general, the server 1 receives the WWW page request from the client PC 3 via the network 2. Upon receiving the WWW page request, the server 1 processes the WWW page request so that the WWW browser 35 receives the requested WWW pages that resides in the server 1 via the network 2. The network 2 utilizes the Hyper Text Transfer Protocol (HTTP) for transmitting WWW information such as the WWW page request as well as the requested WWW page between the communication unit 37 of the client PC 3 and a communication unit 36 of the server 1 via the network adapters 8 and 38.

Still referring to FIG. 6, the preferred embodiment of the server 1 according to the current invention dynamically generates a customized WWW page according to user information and or user requests. The server 1 includes a central processing unit 5, a network adapter 8, a disk storage unit 7, a memory unit 4 and an input/output device such as a display 9a and a keyboard 9b, and these components are connected via a bus 6. The network adapter 8 receives and sends signals to and from the network 2, and the signals include the a WWW page request and a requested WWW page. In order to transmit the requested WWW page, the CPU 5 dynamically generates a WWW page from the information stored in the disk storage unit 7. The information includes a template group 30 containing a group of predetermined templates, a data table 31 containing a group of tables, a batch generation definition group 32 containing a group of page generation definitions and a page group 33 containing a group of pages. A part or all of these groups of the information is copied into the memory 4 at a corresponding data area via a database management system unit (DBMS) 15. The corresponding data areas include a template area 23, a data area 22, a batch page generation definition area 20 and a page area 24. Using the information from the above areas, the CPU 5 executes a batch generation unit or program 13 in a memory unit 4 with the help of other software such as an operating system (OS) 21 and a WWW server unit or program 11. According to one of the WWW page requests from the client PC 3, the WWW server unit or program 11 retrieves a specified WWW page from the page group 33 into the page area 24 before transmitting it back to the WWW browser 35. According to another one of the WWW page requests, the WWW server unit or program 11 outputs a page generation signal to a page generation unit or program 12 to dynamically generate a WWW page 24. In response to the page generation signal, the page generation unit or program 12 generates the dynamic WWW page 24 under the control of the WWW server program 11 and/or a batch page generation control unit 13. The dynamic WWW page 24 is generated based upon a template in the template area 23 and data in the data area 22, and during the interpretation of the template, certain data is obtained from the data group 31 into the data area 22 to fill in the template.

FIG. 6 also shows components involved in a batch page generation process. A batch page generation control unit 13 receives batch page generation definitions from a batch page generation definition area 20 and outputs a page generation signal to the page generation unit or program 12 in response to a time trigger signal from a timer unit 16 or a data update trigger signal from a data update unit 14. The time trigger signal is generated after a predetermined time period while the data update trigger signal is generated when the data update unit 14 updates the data in the data area 22 from the data table 31 via the DBMS 15. The above described batch page generation process prepares the updated dynamic WWW pages in advance of the user requests. This advance dynamic WWW page generation enables high-speed access by substantially eliminating on-the-fly page generation upon the user requests. Because of the advance dynamic WWW page generation, the preferred embodiment of the high-speed dynamic page generation system according to the current invention also takes advantage of a proxy server on the network.

Figure 7:
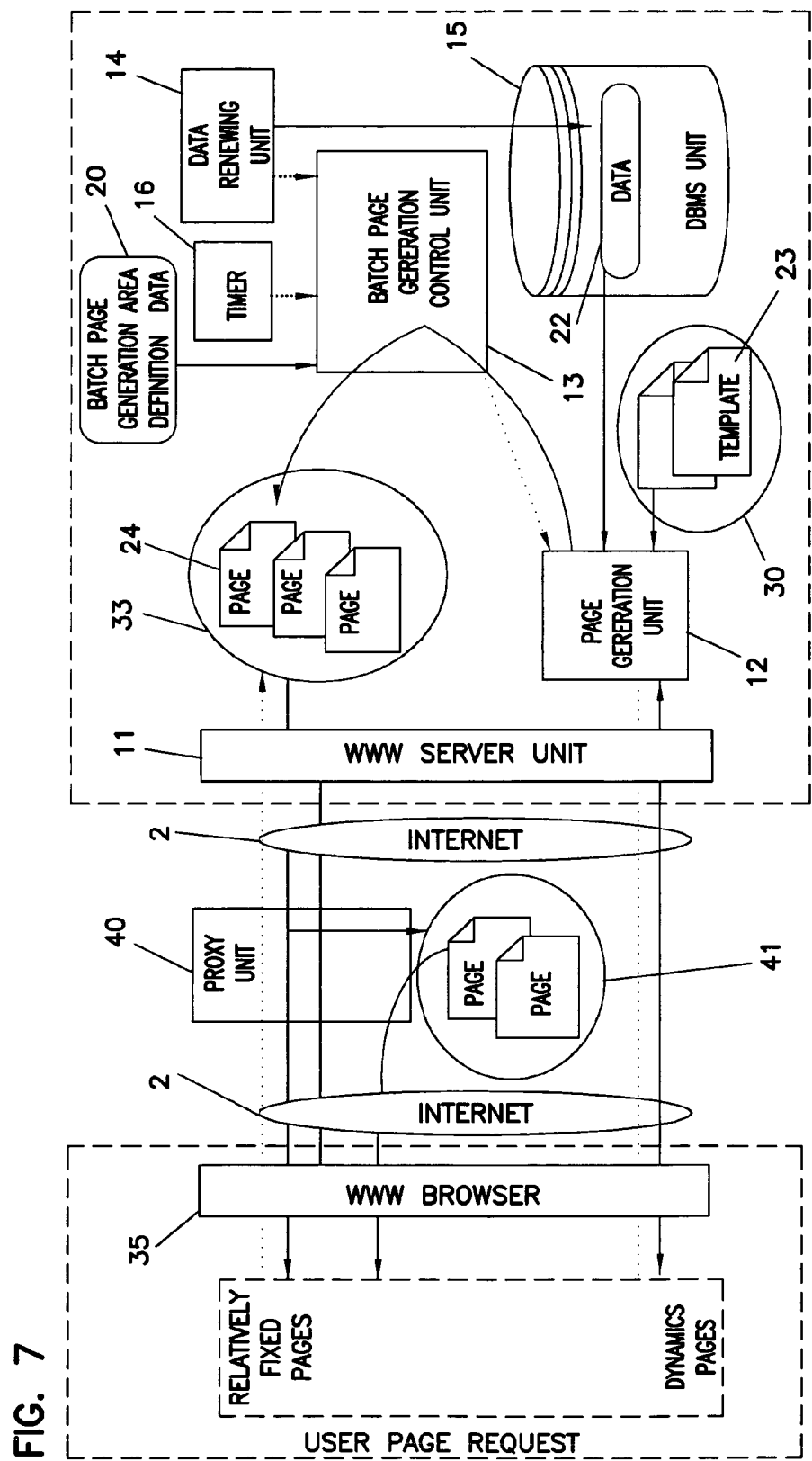
FIG. 7 is a diagram illustrating a general data flow involved in the preferred embodiment of the high-speed dynamic page generation system according to the current invention.

Now referring to FIG. 7, a diagram illustrates a general data flow involved in the preferred embodiment of the high-speed dynamic page generation system according to the current invention. The data update unit or program 14 updates data 22 via the DBMS 15 of FIG. 6. For example, the DBMS 15 may be a commercially available database management system for managing product data, a data synchronization tool, a template update program, a program installer or a set up program. Upon updating the data 22, the data update unit 14 outputs a data update trigger signal to a batch page generation control unit or program 13. The data update trigger signal specifies that a certain type of batch generation or a certain way to perform the batch generation. The data update trigger signal indicates the time of the update and/or the updated data such as a template or associated data. The information in the data update trigger signal is collected not only from a timer unit 16 and the data update unit 14 but also from the program installer, the set up program or a update command inputted by an operator. Some implementations for sending the information to the batch page generation control unit or program 13 includes the use of the OS message exchange facility or a common memory area. The batch page generation control unit 13 determines which page to be generated based upon a batch page generation definition 20. The batch page generation control unit 13 outputs a generation signal to a page generation unit or program 12. Based upon the above determined page, the page generation unit 12 receives the corresponding data 22 and the corresponding template 23. The page generation unit 12 generates the specified page based upon the data 22 and the template 23. Finally, the batch page generation control unit 13 determines a file name for the newly updated or generated page 24 as specified in the batch page generation definition 20 so that the newly updated or generated page 24 is stored with the file name in a storage device for later access via a WWW server unit 11.

Still referring to FIG. 7, the diagram illustrates other general data flows involved in the preferred embodiment of the high-speed dynamic page generation system according to the current invention. Assuming that a page request from a WWW browser 35 refers to a WWW page that is not often updated and that the WWW page has been recently updated, upon receiving the page request via a network 2, the WWW server unit 11 usually transmits the corresponding WWW page 24 from the page group 33 to the browser 35 via the network 2. In this case, a proxy server 40 may effectively serve its function. Upon receiving the WWW page request, the proxy server 40 determines whether or not a copy of the same recently updated WWW page 24 exists in a cash 41 of the proxy server 40. If the same WWW page does exists in the cash 41, the proxy server 40 transmits the WWW page from the cash 41 to the WWW browser 35 via the network 2. As described above, the WWW page has been dynamically generated or updated in advance of an actual user request, and since a copy of the prepared WWW page is also stored in the proxy server 41, the access to the WWW dynamically updated page is optimized. On the other hand, when the above two assumptions are not correct, the preferred embodiment of the high-speed dynamic page generation system generates a requested WWW page in the following manner.

The preferred embodiment of the high-speed dynamic page generation system generates a requested WWW page when it confirms that the requested page is neither available nor updated. When the proxy server 40 determines that the requested page is not in the cash 41 or that the requested page in the cash 41 has not been updated, the proxy server 40 requests the batch page generation control unit 13 to generate the requested page 24. In another case, the requested page is not available in the cash 41 or in the page group 33 in the WWW server unit. A certain WWW page changes every time for each WWW page request. This is because the requested WWW page incorporates certain information that is included in the WWW page request. For example, a name of the user is incorporated in the requested WWW page to customize the page. In this case, the WWW browser 35 directly requests the WWW server unit 11 to generate a new WWW page. In the above described situations, after the batch page generation control unit 13 determines which page to be generated, the page generation unit 12 generates the requested page 24.

Figure 8:
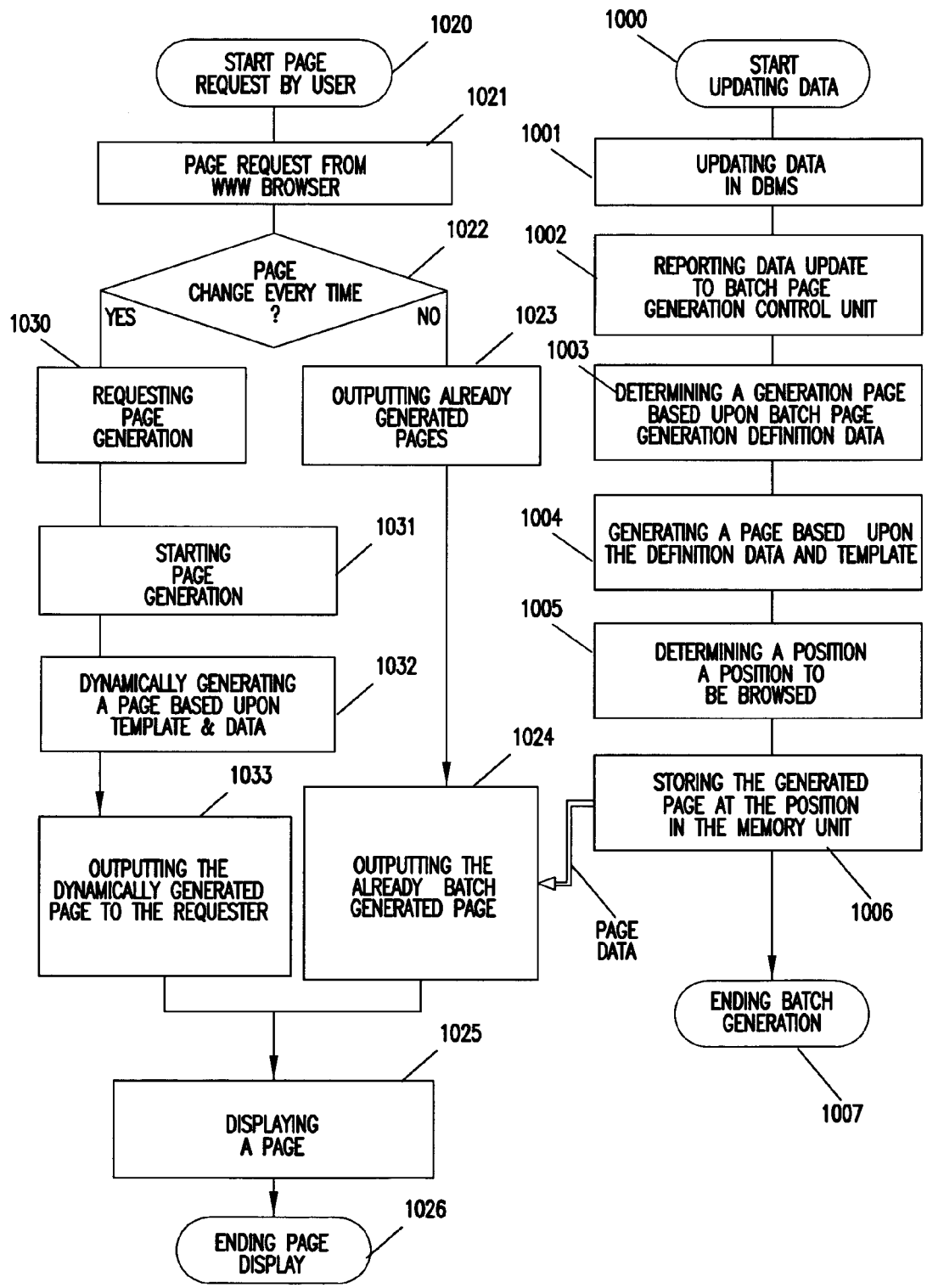
FIG. 8 is a flow chart illustrating acts involved in a preferred process of dynamically generating WWW pages and accessing the dynamically generated WWW pages at a high-speed access according to the current invention.

Now referring to FIG. 8, a flow chart illustrates acts involved in a preferred process of dynamically generating WWW pages and accessing the dynamically generated WWW pages at a high-speed access according to the current invention. In general, the flow chart illustrates two starting points 1000 and 1020. When data used in a WWW page is to be updated, the preferred process starts at act 1000. In act 1001, the data is updated using a data update unit and a data base manager. After the data update in the act 1001, a data update trigger signal is generated to indicate to the batch page generation control unit that the data update event had taken place in act 1002. In response to the data update trigger signal, a page to be generated is determined based upon a batch page generation definition in act 1003. In act 1004, the selected page is generated using a template and data that correspond to the selected page. After the page is generated, a universal resource locator (URL) is determined based upon the batch page generation definition in act 1005, and the generated page is stored in a storage device at a location specified by the URL in act 1006. Thus, the page generation in response to the data update event is completed in act 1007.

Still referring to FIG. 8, the other starting point 1020 for the preferred process of dynamically generating WWW pages occurs when a user requests a WWW page through a browser in act 1021. It is determined in act 1022 whether or not the requested WWW page changes every time a request is made. To determine whether or not the requested WWW page changes every time a request is made in the act 1022, a WWW server uses the page request information. For example, a static page URL is "http://www.aaa.co.jp/a_g_1000a.html" while a dynamic page URL is "http://www.aaa.co.jp/cgi-bin/page?TEMPLATE=a.html&ITEM=1000a). Because there is a difference in the page request format, the WWW server uses the page request information to determine whether the requested page is static or dynamic. When a static page such as a product page is requested by a URL such as "http://www.aaa.co.jp/a_g_1000a.html," it is determined that the page usually does not change for each page request in act 1022, and an already generated signal is outputted in act 1023. Based upon the already generated signal from the act 1023, the page that has been generated in acts 1001 through 1006 is transmitted to the user in act 1024. The WWW server unit usually transmits the requested page through the network to the browser that originated the page request. The transmitted page is displayed in the original browser in act 1025. On the other hand, when it is determined that the page usually changes for each page request in the act 1022, a page generation request is issued in act 1030. In response to the page generation request from the act 1030, a page generation starts in act 1031. In act 1032, the requested page is generated according to a selected template and data. The newly generated page is transmitted to the browser that originated the page request via the network in act 1033. Lastly, the transmitted page is displayed in the original browser in the act 1025. The page display ends in act 1026.

FIG. 9 illustrates one example of batch page generation definitions used in the preferred process of dynamically generating WWW pages according to the current invention. In order to start a batch page generation, an update trigger signal has to be generated according to one of the predetermined trigger types and triggering conditions. That is, a trigger type event satisfies a corresponding trigger condition. For example, if a trigger type is time as shown in a trigger ID 71, a template C has a time sensitive item that needs to be updated when it is 6 AM. When the time is 6 AM for the time trigger, an associated batch page generation command, "page TEMPLATE=c.html" is issued to the page generation unit. The newly generated file in response to the time trigger is named as "c_g_.html." Similarly, for a data update type 72, when data for a product A is updated, the batch page generation command "page TEMPLATE=a.html & ITEM=1000a" is issued. ITEM=1000a indicates that the template, a.html contains information for the item 1000a. The batch page generation is limited to pages containing the item 1000a information. On the other hand, for a data update type 73, when a template itself is updated, the batch page generation command "page TEMPLATE=a.html & ITEM=*" is issued. ITEM=* indicates that since the template, a.html is updated, all pages that are to be generated from the information contained in the template a.html are generated. It is also possible to specify a certain group of items such as outdoor items by "ITEM=Group=outdoor." In this example, all pages that contains the outdoor item data are updated. As described above, based upon the batch page generation definitions, the pages are generated in a flexible and dynamic manner to reflect a life cycle of each page according to the content of the page. In an alternative process of dynamically generating WWW pages according to the current invention, in stead of storing a predetermined name, a uniquely generated page file name is determined based upon a combination of the template name and the item name. Furthermore, in order to determine a URL, the unique file name such as "a_g_1000a.html" is appended to a predetermined location such as "http:\www.aaa.co.jp\" so that the generated page is stored at a unique address, http:\www.aaa.co.jp\a_g_1000a.html.

FIG. 10 shows an exemplary template which is used in the preferred process of dynamically generating WWW pages according to the current invention. A single template is usually stored in a single file in the disk storage unit of a server computer. The exemplary template 40000A includes page data generation commands 40001 through 40017 in the HTML. For example, an ECEX sentence 40002 includes a command to search a RDB in a data group 31 as shown in FIG. 6, and the result is substituted in $KEYWORD and $NCOND. These results are used in HTML sentences 4064 and 405. RPEAT in sentences 40004 and 40007 indicates that the sentences 40005 and 40006 are repeated for a number of searched records to generate a corresponding number of items in a page.

FIG. 11 shows an exemplary page 40000B that was generated from the template 40000A of FIG. 10 and the searched data as the page was dynamically generated according to the current invention. The page 40000B now has HTML sentences 40030 and 40031 whose variables have been substituted by the results of the searches as specified by the commands in the template 40000A in FIG. 10. For example, a number of product variable $COUNT has been replaced by a search result "184." This is a number of records in a data group 31. Each record has at least one of "text, voice, image and animation." The search condition $CONDITION is blank, and an initial page is generated. The generated product page is the same for all the users, and it will change only when the product data is updated. FIG. 12 illustrate an exemplary display output generated by a browser according to the HTML page 40000B of FIG. 11. The HTML page 40000B illustrates only a portion of the HTML sentences to generate the display shown in FIG. 12. That is, the HTML page 4000B shows the HTML sentences to display a portion 50, but it does not show the HTML sentences to generate display portions 51 and 52. When the user selects a certain item in the display, the search condition is now specified for sub-classifications. The same template 40000A is used for a search for the sub-classifications.

Figure 13:
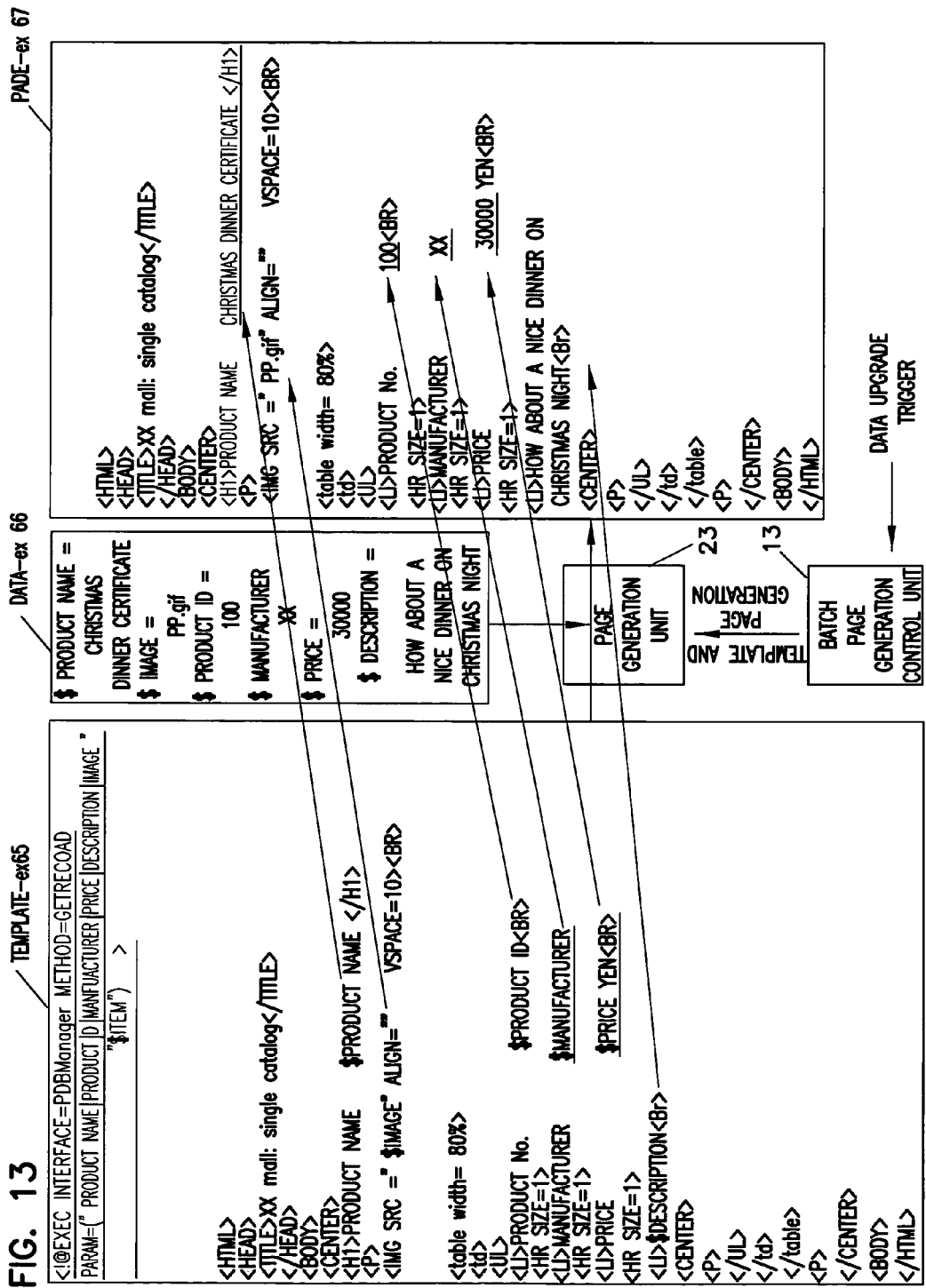
FIG. 13 is a template and a data set that are used in the first preferred process of dynamically generating WWW pages.
Figure 15:
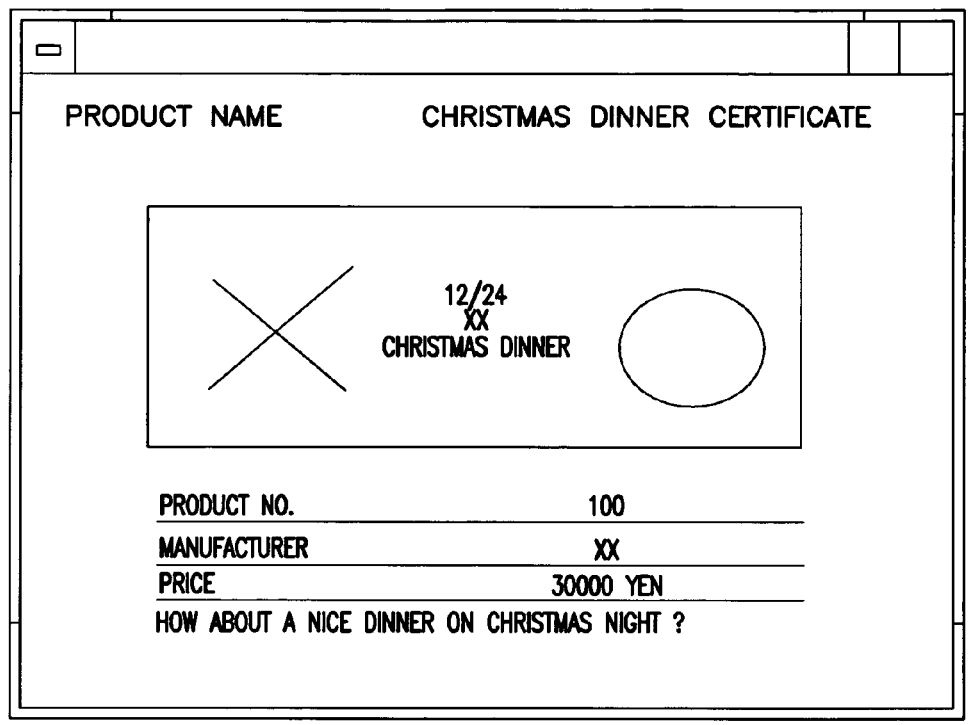
FIGS. 15 and 16 illustrate generated pages that are displayed on the browser.
Figure 16:
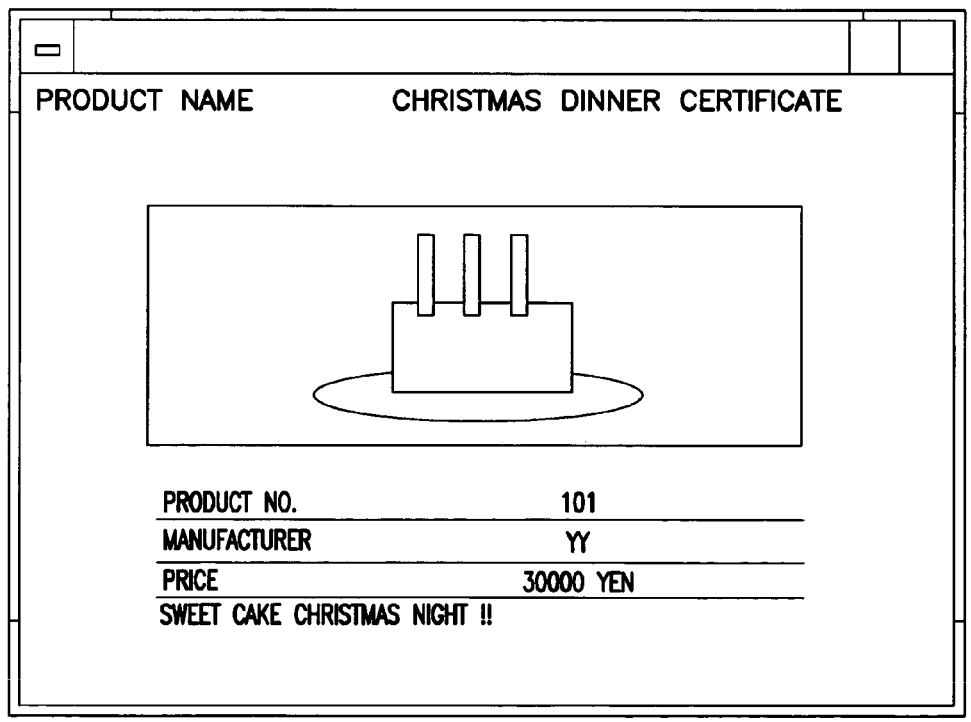

To further illustrate a page generation, now referring to FIG. 13, a template 65 and a data set 66 are used in the first preferred process of dynamically generating WWW pages. Initially, the underlined EXEC commands in the template 65 are executed with a parameter specification ITEM=1000a. To find the corresponding data for ITEM=1000a, a product data table is opened as illustrated in FIG. 14. In a product ID 60 column, data associated with the product item 1000a is found in a row 61. Thus, for example, the product name is found to be "Christmas dinner certificate" which substitutes a variable $product name. As shown in FIG. 13, in response to a data update trigger signal to control of a batch page generation control unit 13, a page generation unit 23 substitutes the variables in the template 65 with searched data 66 for ITEM=1000a from the product data table of FIG. 14 to generate a page 67. According to the above described page generation process, the generated page 67 is now displayed as shown in FIG. 15. When the parameter is changed to ITEM=1000b, in a product ID 60 column, data associated with the product item 1000a is found in a row 62, and the page is generated accordingly. The generated page for ITEM=1000b is now displayed as shown in FIG. 16.

In an alternative embodiment, a batch page generation is sequentially performed. In other words, in stead of completing the process to turn a template into a page upon the user page access request, the page is prepared in advance of the user access request and the prepared page is stored. At the first page generation, a template becomes substantially static by substituting most or all variables by searched data. Upon the user page access request, the stored page is now used as a template. This sequential or layered approach still advantageously reduces the page generation time at the time of the user request. For example, after a user page access request such as "http://www.aaa.co.jp/cgi-bin/page? TEMPLATE=a.html&ITEM=1000a," a page is generated and stored as "a_g.html." In response to "http://www.aaa.co.jp/cgi-bin/page? TEMPLATE=a_g.html&ITEM=1000a," the previously generated page is efficiently accessed. The addition of a link relation "_g" allows the above efficient access. This method is especially useful for a template that requires a lengthy page generation process. Another advantage is that the page generation is flexibly controlled. When the a_g.html file exists upon the user page access request, the page is transmitted from the existing file. On the other hand, when the a_g.html file does not exist upon the user page access request, the page generation takes place. For example, since the page file is being locked while the corresponding page generation is in progress, when the page access request arrives during the page generation, the new page generation is switched to proceed from the corresponding template.

Figure 17:
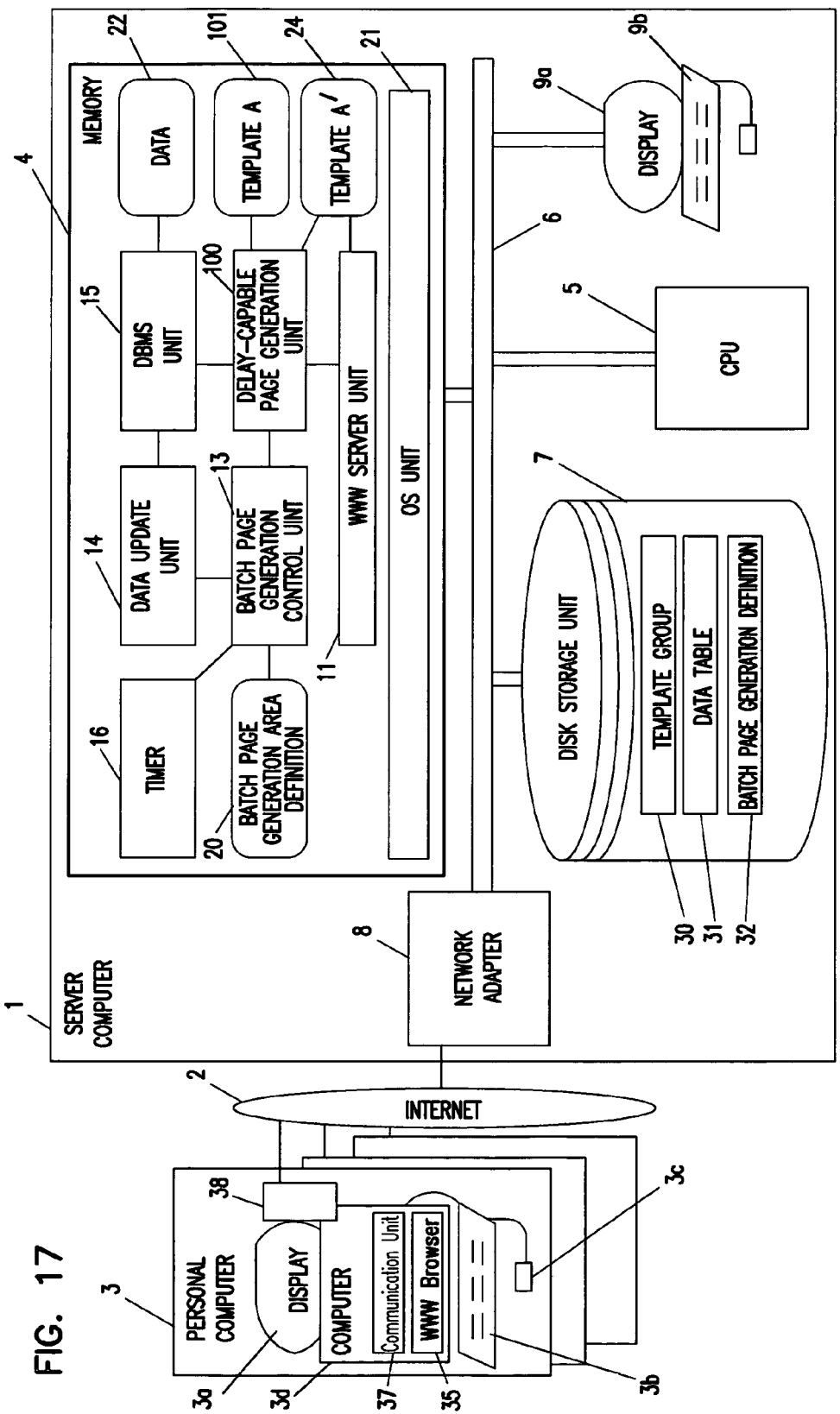
FIG. 17 is a block diagram illustrating a second preferred embodiment of the high-speed dynamic page generation system according to the current invention.

Now referring to FIG. 17, a block diagram illustrates a second preferred embodiment of the high-speed dynamic page generation system according to the current invention. The second preferred embodiment includes a server or a server computer 1, a client or a client personal computer (PC) 3, and a network 2 that connects the server 1 and the client 3 via the Internet and Intranet. The client PC 3 further includes a central processing unit (CPU) 3d, a network adapter 38, an output device such as a display unit 3a as well as an input device such as a keyboard 3b and a mouse 3c. The CPU 3d executes software instructions such as a world-wide web (WWW) browser 35. Using the input devices 3b and 3c, the user requests a world-wide web (WWW) page within the WWW browser 35, and the client PC 3 formulates a WWW page request to the server 1. In general, the server 1 receives the WWW page request from the client PC 3 via the network 2. Upon receiving the WWW page request, the server 1 processes the WWW page request so that the WWW browser 35 receives the requested WWW pages that resides in the server 1 via the network 2. The network 2 utilizes the Hyper Text Transfer Protocol (HTTP) for transmitting WWW information such as the WWW page request as well as the requested WWW page between the client PC 3 and the server 1 via the network adapter 8.

Still referring to FIG. 17, the preferred embodiment of the server 1 according to the current invention dynamically generates a customized WWW page according to user information and or user requests. The server 1 includes a central processing unit 5, a network adapter 8, a disk storage unit 7, a memory unit 4 and an input/output device such as a display 9a and a keyboard 9b, and these components are connected via a bus 6. The network adapter 8 receives and sends signals to and from the network 2, and the signals include the a WWW page request and a requested WWW page. In order to transmit the requested WWW page, the CPU 5 dynamically generates a WWW page from the information stored in the disk storage unit 7. The information includes a template group 30 containing a group of predetermined templates, a data table 31 containing a group of tables and a batch generation definition group 32 containing a group of page generation definitions. A part or all of these groups of the information is copied into the memory 4 at a corresponding data area via a database management system unit (DBMS) 15. The corresponding data areas include a first template area 101, a data area 22, a batch page generation definition area 20 and a second template area 102. Using the information from the above areas, the CPU 5 executes a batch generation unit or program 13 in a memory unit 4 with the help of other software such as an operating system (OS) 21 and a WWW server unit or program 11. According to one of the WWW page requests from the client PC 3, the WWW server unit or program 11 retrieves a specified WWW page from the page group 33 into the page area 24 before transmitting it back to the WWW browser 35.

According to another one of the WWW page requests that is not from the client PC 3, the WWW server unit or program 11 outputs a page generation signal to a delay-capable page generation unit or program 100 to dynamically generate a WWW page 24. In response to the page generation signal, the delay-capable page generation unit 100 interprets a template A that has been read from the template group 30 in the first template area 101. The delay-capable page generation unit 100 generates a template A' in a memory area 102 under the control of the WWW server program 11 and/or a batch page generation control unit 13. The template A' is generated based upon the template A in the template area 101 and data in the data area 22, and during the interpretation of the template, certain data is obtained from the data group 31. The batch page generation control unit 13 stores the newly generated template A' in the template group 30 in the disk storage unit 7 to be later retrieved by the delay-capable page generation unit 100. Upon receiving the WWW page request from the browser 35, the delay-capable page generation unit 100 generates the requested WWW page that corresponds to the stored template A' in the area 102. The server 1 transmits the newly generated WWW page to the client PC 3. The template A' has been generated in advance to reflect a change in the server environment so that the same process is eliminated at the page generation upon receiving a WWW page request from a user. Upon receiving a user WWW page request, the template A' is used to speed up the page generation process even if the user information is processed to generate the requested WWW page.

Figure 18:
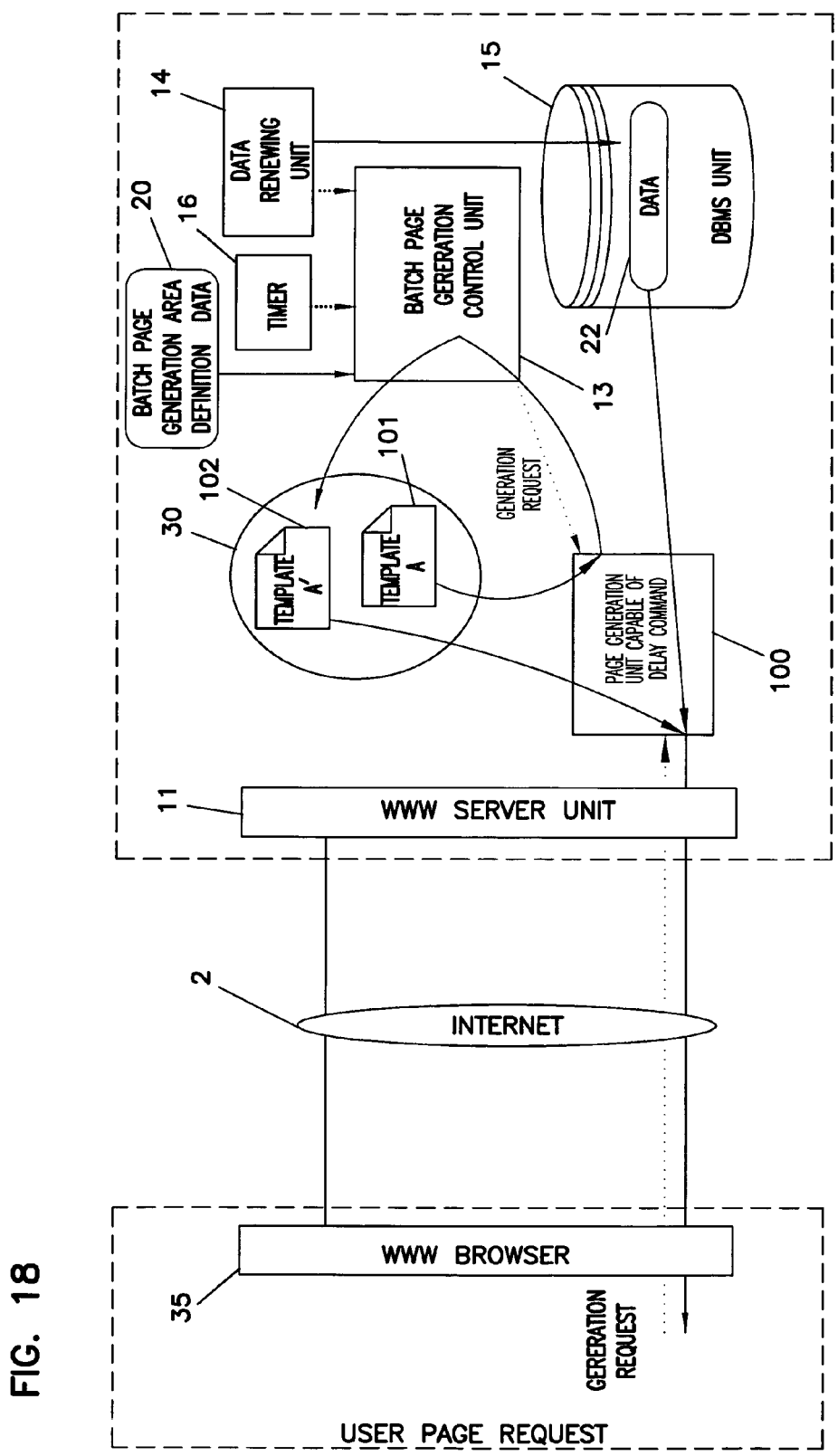
FIG. 18 is the diagram illustrating other general data flows involved in the preferred embodiment of the high-speed dynamic page generation system according to the current invention.

Now referring to FIG. 18, a diagram illustrates a general data flow involved in the second preferred embodiment of the high-speed dynamic page generation system according to the current invention. In the alternative, a timer program or unit 16 generates a time trigger signal indicative of updating a certain predetermined portion of data and outputs the time trigger signal to the batch page generation control unit or program 13. The data update unit or program 14 updates data 22. Upon updating the data 22, the data update unit 14 outputs a data update trigger signal to a batch page generation control unit or program 13. The data update trigger signal specifies that a certain type of batch generation or a certain way to perform the batch generation. The data update trigger signal indicates the time of the update and/or the updated data such as a template or associated data. The information in the data update trigger signal is collected not only from a timer unit 16 and the data update unit 14 but also from the program installer, the set up program or a update command inputted by an operator. Some implementations for sending the information to the batch page generation control unit or program 13 includes the use of the OS message exchange facility or a common memory area. The batch page generation control unit 13 determines which page to be generated based upon a batch page generation definition 20. The batch page generation control unit 13 outputs a generation signal to a delay-capable page generation unit or program 100. Based upon the above determined page, the delay-capable page generation unit 100 receives the corresponding data 22 and the corresponding first template A 101. The first template A 101 has a delay execution command, and the delay-capable page generation unit 100 interprets this command to generate another template rather than a page. The delay-capable page generation unit 100 generates a second template A' 102 based upon the data 22 and the first template A 101. The second template A' 102 is stored the template group 30 in the disk storage unit 7 as shown in FIG. 17.

The delay execution commands are further illustrated. For example, the first template A 101 includes the following delay execution commands:

<!@non EXEC INERFACE=PDBManager Method=GetRead Param=(a>1)>

<!@non $product name>

The delay-capable page generation unit 100 interprets these delay execution commands by identifying a condition, "non" and generates the second template A' 102 by removing the condition. Thus, the second template A' 102 contains the following commands:

<!@ EXEC INERFACE=PDBManager Method=GetRead Param=(a>1)>

<!® $product name>

The above commands are identical to those before the interpretation except that they are now immediately executable.

Still referring to FIG. 18, the diagram illustrates other general data flows involved in the preferred embodiment of the high-speed dynamic page generation system according to the current invention. Assuming that a page request from a WWW browser 35 refers to a WWW page that has been recently updated and that the corresponding second template A' 102 is stored in the disk storage 7, upon receiving the page request via a network 2, the delay-capable page generation unit 100 generates a requested WWW page based upon the second template A' 102 and the data 22. The execution delay commands in the first template A 101 are now executed since these commands are stored as immediately executable ones in the second template A' 102. The generated page is transmitted via the network 2 to the browser 35, which issued the page WWW request.

Figure 19:
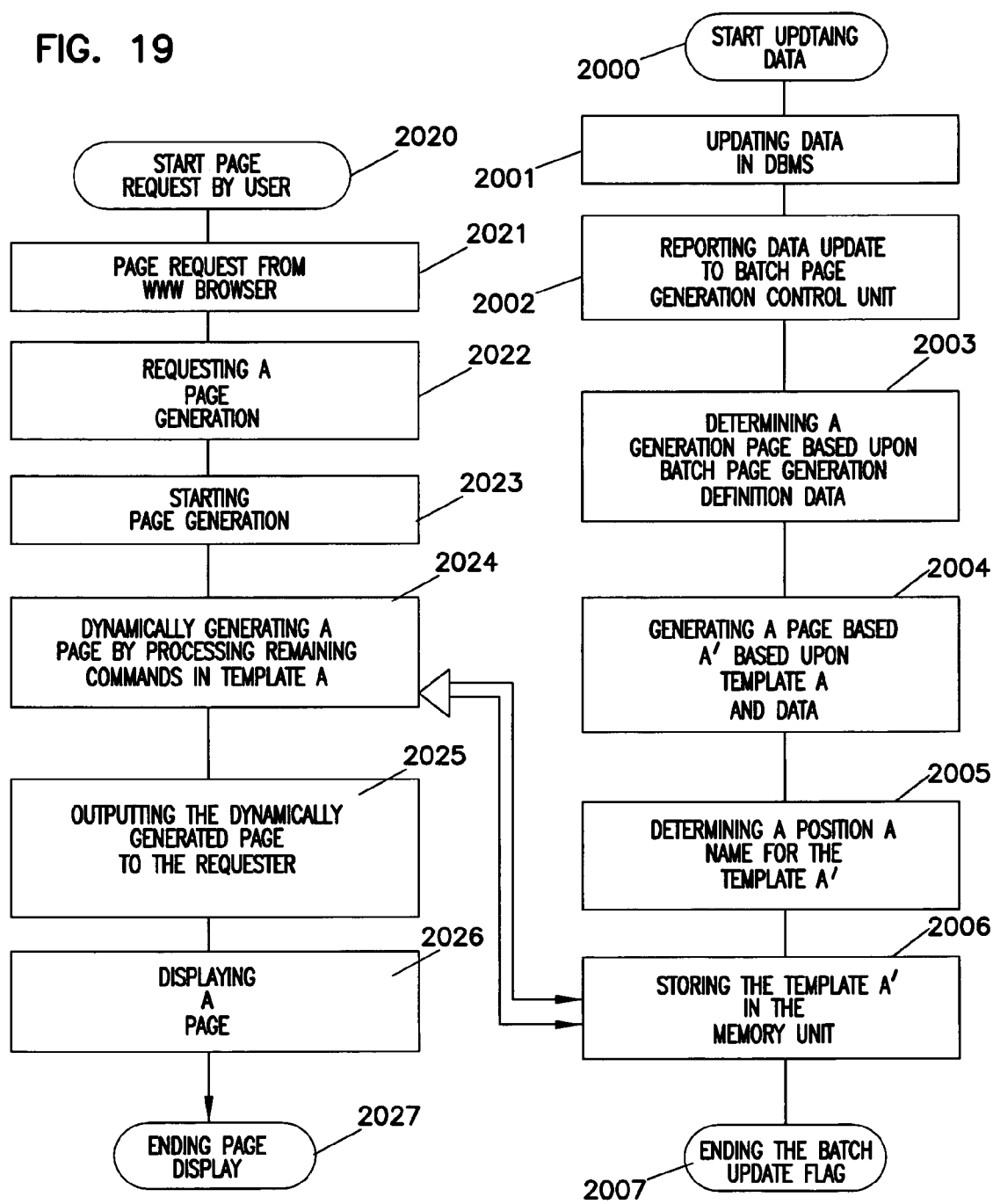
FIG. 19 is a flow chart illustrating acts involved in a second preferred process of dynamically generating WWW pages and accessing the dynamically generated WWW pages at a high-speed access according to the current invention.

Now referring to FIG. 19, a flow chart illustrates acts involved in a second preferred process of dynamically generating WWW pages and accessing the dynamically generated WWW pages at a high-speed access according to the current invention. In general, the flow chart illustrates two starting points 2000 and 2020. When data used in a WWW page is to be updated, the preferred process starts at act 2000. In act 2001, the data is updated using a data update unit and a data base manager. After the data update in the act 2001, a data update trigger signal is generated to indicate to the batch page generation control unit that the data update event had taken place in act 2002. In response to the data update trigger signal, a page to be generated is determined based upon a batch page generation definition in act 2003. In act 2004, the selected page is generated as a second template A' using a first template A and data that correspond to the selected page. The delay execution commands embedded in the HTML of the first template A are converted into immediately executable commands in the second template A'. After the second template A' is generated, a universal resource locator (URL) is determined based upon the batch page generation definition in act 2005, and the generated second template A' is stored in a storage device at a location specified by the URL in act 2006. Thus, the page generation in response to the data update event is completed in act 2007.

Still referring to FIG. 19, the other starting point 2020 for the preferred process of dynamically generating WWW pages occurs when a user requests a WWW page through a browser in act 2021. The URL in the WWW page request is used to determine whether or not the requested WWW page is the one corresponds to the first template A and the second template A'. For example, a URL is "http://www.aaa.co.jp/cgi-bin/page?TEMPLATE=ad.html&ITEM=1000a" The WWW page request is sent to the server unit identified by "http://www.aaa.co.jp/" in act 2022, and the server starts the page generation in act 2023. In act 2024, the requested page is generated according to the second template A' and data. The second template A' is identified by "ad.html" while the data is identified by "ITEM=1000a." The second template A' is stored at the location specified in the act 2006 and has now immediately executable commands. Only these immediately executable commands are now executed. The newly generated page is transmitted to the browser that originated the page request via the network in act 2025. Lastly, the transmitted page is displayed in the original browser in the act 2026. The page display ends in act 2027.

Figure 20:
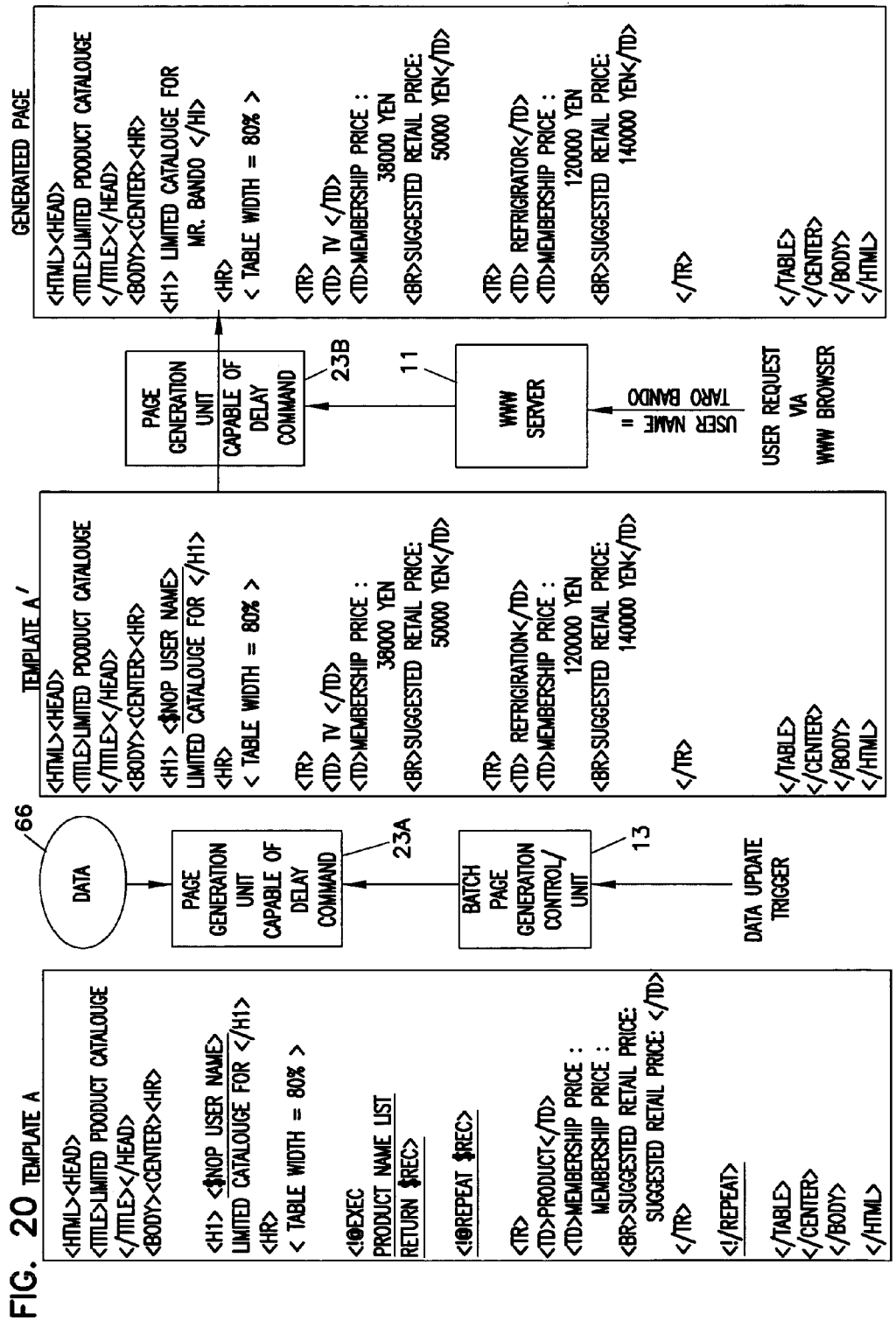
FIG. 20 illustrates a first template, a second template and a data set are used in the second preferred process of dynamically generating WWW pages according to the current invention.

FIG. 20, a first template A, a second template A' and a data set 66 are used in the second preferred process of dynamically generating WWW pages. Initially, a delay-capable page generation unit 23a executes the underlined EXEC commands without "$NOP" in the first template A under the control of the batch page generation control unit 13 in response to a data update trigger signal. The delay-capable page generation unit 23a converts the delayed execution commands into the immediately executable commands by removing the "$NOP" notations, and the result is stored as a second template A'. For example, the first template A includes "<$nop $User Name>, and this delay command is converted into an immediately executable command" <$User Name>, which is stored in the second template A'. Later, upon receiving from a user WWW browser a page request that corresponds to the first template A, a WWW server 11 initiates the page generation to the delay-capable page generation unit 23b. The delay-capable page generation unit 23b generates a requested page based upon the second template A'. Using the same example, the delay-capable page generation unit 23 now executes the immediately executable command, $User Name in the second template A' and substitutes the user name variable with the name of the page requester, "Mr. Bando." Since other executable commands have been already completed when the second template A' was generated from the first template A, the page generation from the second template A' is substantially speeded up.

The above described page generation is advantageous when a requested page includes information that needs to be updated when the corresponding data is modified and that is not available until the user page request arrives. In other words, the second template A' is prepared from the first template A in advance of a user page request whenever the relevant data for the first template A is modified or updated. The page is efficiently completed based upon the second template A' and the incoming information when the user page request occurs. This process allows efficient generation of a customized page for an individual user. In addition to the above described customized user name, more general information can be used in a delayed manner. For example, the general information includes the current time, a number of access to a certain page, and the final page from the second template A' is generated according to the general information. In an alternative embodiment, in stead of the above described data update, other sources of triggers are used to generate the second template A'. The examples of the alternative trigger sources include a time-base trigger.

Figure 21:
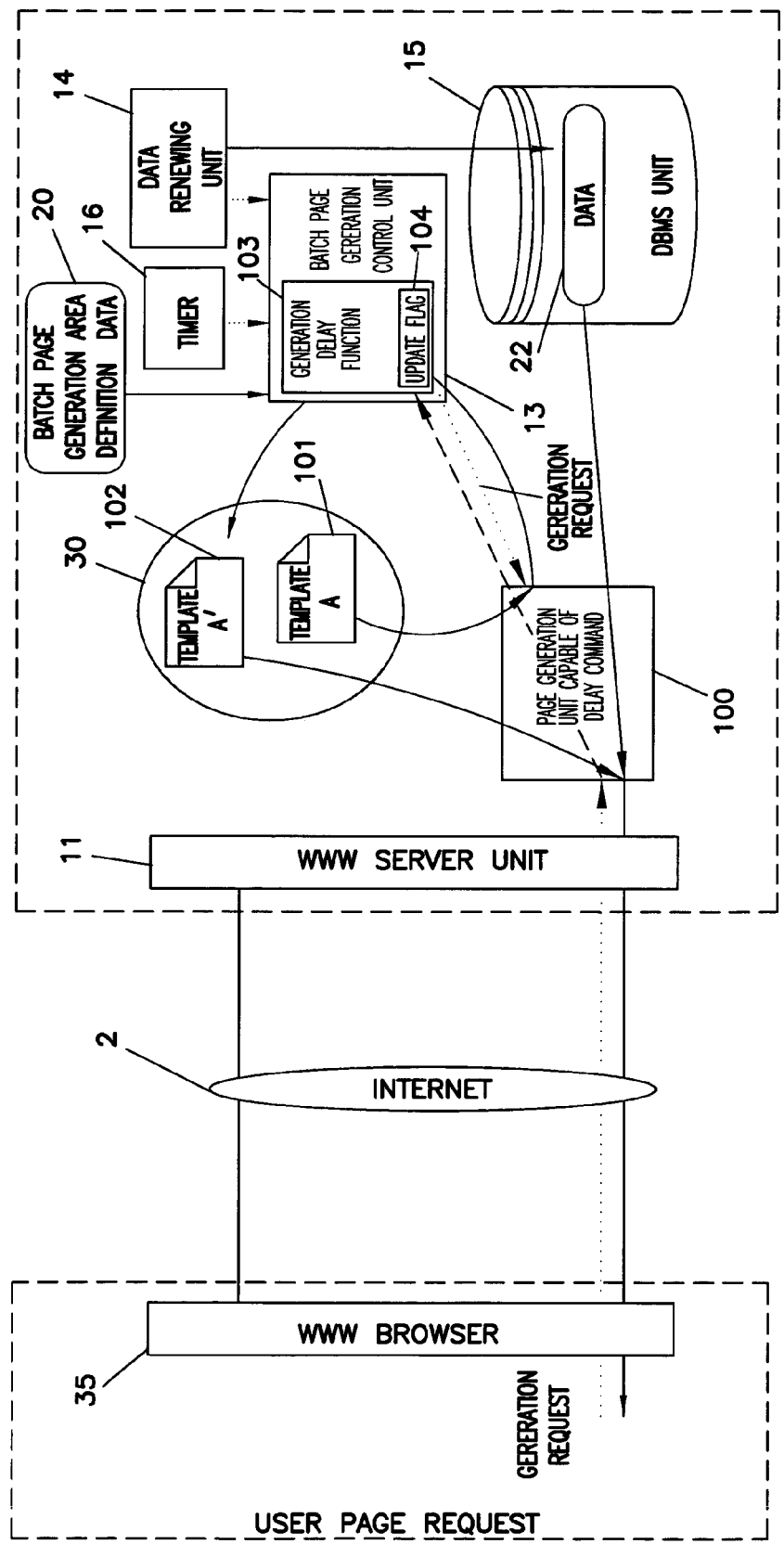
FIG. 21 is a diagram illustrating a general data flow involved in the third preferred embodiment of the high-speed dynamic page generation system according to the current invention.

Now referring to FIG. 21, a diagram illustrates a general data flow involved in the third preferred embodiment of the high-speed dynamic page generation system according to the current invention. The data update unit or program 14 updates data 22. In the alternative, a timer program or unit 16 generates a time trigger signal indicative of updating a certain predetermined portion of data and outputs the time trigger signal to a batch page generation control unit or program 13. Upon updating the data 22, the data update unit 14 outputs a data update trigger signal to the batch page generation control unit or program 13. The data update trigger signal specifies that a certain type of batch generation or a certain way to perform the batch generation. The data update trigger signal indicates the time of the update and/or the updated data such as a template or associated data. The information in the data update trigger signal is collected not only from a timer unit 16 and the data update unit 14 but also from the program installer, the set up program or a update command inputted by an operator. Some implementations for sending the information to the batch page generation control unit or program 13 includes the use of the OS message exchange facility or a common memory area. The batch page generation control unit 13 determines which page to be generated based upon a batch page generation definition 20. The batch page generation control unit 13 further includes an update flag 104 for each page in a delay generation function unit 103.

Upon receiving the data update trigger signal or the time trigger signal a page corresponding to a first template A 101, the batch page generation control unit 13 sets a corresponding one of the update flag or tuns it on. While the update flag is set or on for the page corresponding to the first template A 101, if the delay-capable page generation unit 100 receives a page request for the corresponding first template A 101, the delay-capable page generation unit 100 generates a second template A' 102 based upon the data 22 and the first template A 101. The second template A' 102 is stored the template group 30 in the disk storage unit 7 as shown in FIG. 17. After the second template A' 102 is generated, the corresponding flag is reset or turned off. On the other hand, while the update flag is reset for the page corresponding to the first template A 101, if the delay-capable page generation unit 100 receives a page request for the corresponding first template A 101, the delay-capable page generation unit 100 simply returns the already generated corresponding page. By confirming with the delay generation function 103, it is guaranteed that the second template A' 102 has been already updated.

Still referring to FIG. 21, the diagram illustrates other general data flows involved in the third preferred embodiment of the high-speed dynamic page generation system according to the current invention. Assuming that a page request from a WWW browser 35 refers to a WWW page that has been recently updated and that the corresponding second template A' 102 is stored in the disk storage 7, upon receiving the page request via a network 2, the delay-capable page generation unit 100 generates a requested WWW page based upon the second template A' 102 and the data 22. The execution delay commands in the first template A 101 are now executed since these commands are stored as immediately executable ones in the second template A' 102. The generated page is transmitted via the network 2 to the browser 35, which issued the page WWW request.

Figure 22:
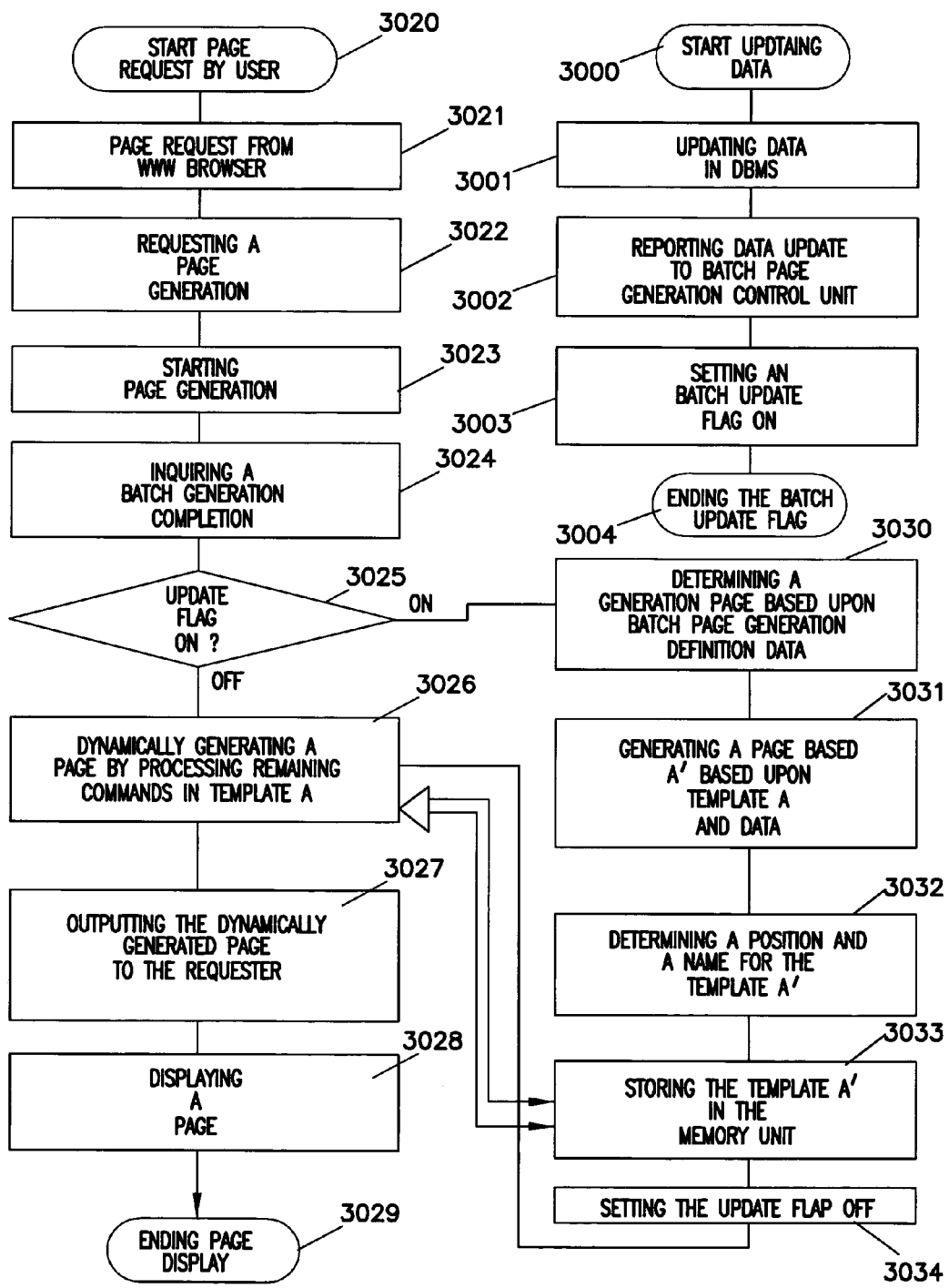
FIG. 22 is a flow chart illustrating acts involved in a third preferred process of dynamically generating WWW pages and accessing the dynamically generated WWW pages at a high-speed access according to the current invention.

Now referring to FIG. 22, a flow chart illustrates acts involved in a third preferred process of dynamically generating WWW pages and accessing the dynamically generated WWW pages at a high-speed access according to the current invention. In general, the flow chart illustrates two starting points 3000 and 3020. When data used in a WWW page is to be updated, the preferred process starts at act 3000. In act 3001, the data is updated using a data update unit and a data base manager. After the data update in the act 3001, a data update trigger signal is generated to indicate to the batch page generation control unit that the data update event had taken place in act 3002. Each of the update flag as defined in the batch page generation definition is set or turned on in act 3003 to indicate that the relevant page should be later updated. In act 3004, the initialization of the update flag is completed.

Still referring to FIG. 22, the other starting point 3020 for the third preferred process of dynamically generating WWW pages occurs when a user requests a WWW page through a browser in act 3021. A request for generating the selected page as a second template A' from a first template A and the corresponding data is made to the WWW server in act 3022. The WWW server initiates the page generation in act 3023. The page generation unit inquires into the status of the corresponding update flag in the delay generation function unit in act 3024. If the update flag is OFF in act 3025, a page is generated from the second template A' and the corresponding data in act 3026. Only these immediately executable commands in the second template A' are now executed. The newly generated page is transmitted to the browser that originated the page request via the network in act 3027. Lastly, the transmitted page is displayed in the original browser in the act 3028. The page display ends in act 3029. On the other hand, if the update flag is ON in act 3025, the page to be generated is determined according to the batch page generation definition in act 3030. A second template A' is generated based upon the first template A and the corresponding data in act 3031, and if there any delayed commands in the first template A, these commands are converted into immediately executable commands in the second template A'. After the second template A' is generated, a universal resource locator (URL) is determined based upon the batch page generation definition in act 3032, and the generated second template A' is stored in a storage device at a location specified by the URL in act 3033. The update flag is now reset or turned off in act 3034. After the act 3034, the preferred process proceeds to the act 3026.

Figure 23:
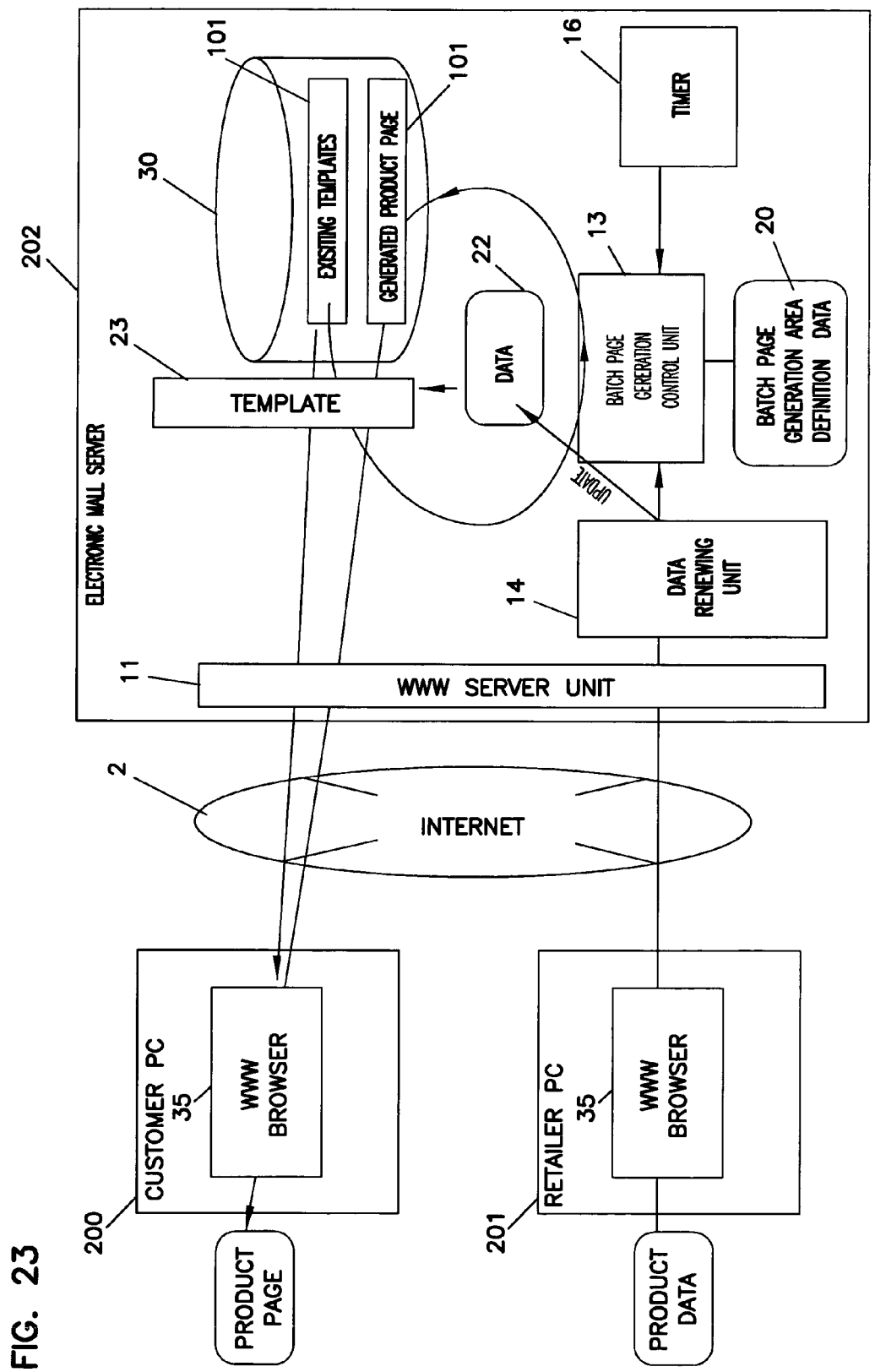
FIG. 23 is a diagram illustrating a data flow involved in the E-commerce such as an electronic mall of the preferred embodiment of the high-speed dynamic page generation system according to the current invention.

Now referring to FIG. 23, a diagram illustrates a data flow involved in the E-commerce such as an electronic mall of the preferred embodiment of the high-speed dynamic page generation system according to the current invention. The electronic or virtual mall includes a store 201 and a customer 200. The store 201 maintains products information centrally in a virtual mall server 202. In response to the request to change certain product information from a store 20, the data update unit or program 14 updates data such as product data 22, and page generation definition data is defined to update a product catalogue whenever its product data is modified. Upon updating the product data 22, the data update unit 14 outputs a data update trigger signal to a batch page generation control unit or program 13. The data update trigger signal specifies that a certain type of batch generation or a certain way to perform the batch generation. The data update trigger signal indicates the time of the update and/or the updated data such as a template or associated data. The batch page generation control unit 13 determines which page to be generated based upon a batch page generation definition 20. The batch page generation control unit 13 outputs a generation signal to a page generation unit or program 23. Based upon the above determined page, the page generation unit 23 receives the corresponding data 22 and the corresponding template 101. The page generation unit 12 generates the specified product page based upon the data 22 and the template 101. Finally, the batch page generation control unit 13 determines a file name for the newly updated or generated product page 102 as specified in the batch page generation definition 20 so that the newly updated or generated product page 24 is stored with the file name in a storage device for later access via a WWW server unit 11.

Still referring to FIG. 23, the diagram illustrates other general data flows involved in the preferred embodiment of the high-speed dynamic page generation system used for the E-commerce according to the current invention. The customer 200 is interested in a certain product and browses a catalogue at the virtual mall 202. Assuming that a page request from a WWW browser 35 refers to a WWW page, upon receiving the page request via a network 2, the WWW server unit 11 usually transmits the corresponding WWW page 24 from the page group 33 to the browser 35 via the network 2. If a huge number of pages needs to be updated for a product information change, only certain pages that are frequently accessed or whose generation process is lengthy are defined to be generated in the batch page generation definition data 20. As described above, the WWW page has been dynamically generated or updated in advance of an actual user request, the access to the WWW dynamically updated page is optimized. Furthermore, when the customer 200 searches certain product, a product page is generated only after a search.

Now referring to FIG. 24, a flow chart illustrates acts involved in the exemplary use of a preferred process of dynamically generating WWW pages and accessing the dynamically generated WWW pages at a high-speed access according to the current invention. In general, the flow chart illustrates two starting points 4000 and 4020. When product data used in a WWW page is to be updated, the preferred process starts at act 4000. In act 4001, a store participating in a virtual mall wants to update its product information, the product data is uploaded to a server where the product information is kept. After the data upload in the act 4001, the server sends the uploaded information to a data update unit in act 4002. In response to the uploaded data, the data update unit updates or replaces the corresponding product data with the newly uploaded data, and an update trigger is sent to a batch page generation definition control unit 13 in act 1003. In act 1004, based upon the batch page generation definition data, the selected page is generated using a template and the newly updated data that correspond to the selected page. After the product page is generated, the generated product page is stored in a storage device at a location in act 4005. Thus, the page generation in response to the data update event is completed in act 4006.

Still referring to FIG. 24, the other starting point 4020 for the preferred process of dynamically generating WWW pages occurs when a customer requests a WWW page for the product information through a browser in act 4021. The WWW server initiates the page generation in act 4022. A new product page is dynamically generated using the above stored product page as a template in act 4023. The newly generated page is transmitted to the browser that originated the page request via the network in act 4024. Lastly, the transmitted page is displayed in the original browser in the act 4025. The page display ends in act 4026. The above virtual mall example illustrates the flexible product information management as well as the dynamic and efficient product page generation. As a result, the customers are able to access the most updated product information in an efficient manner.

Figure 1:
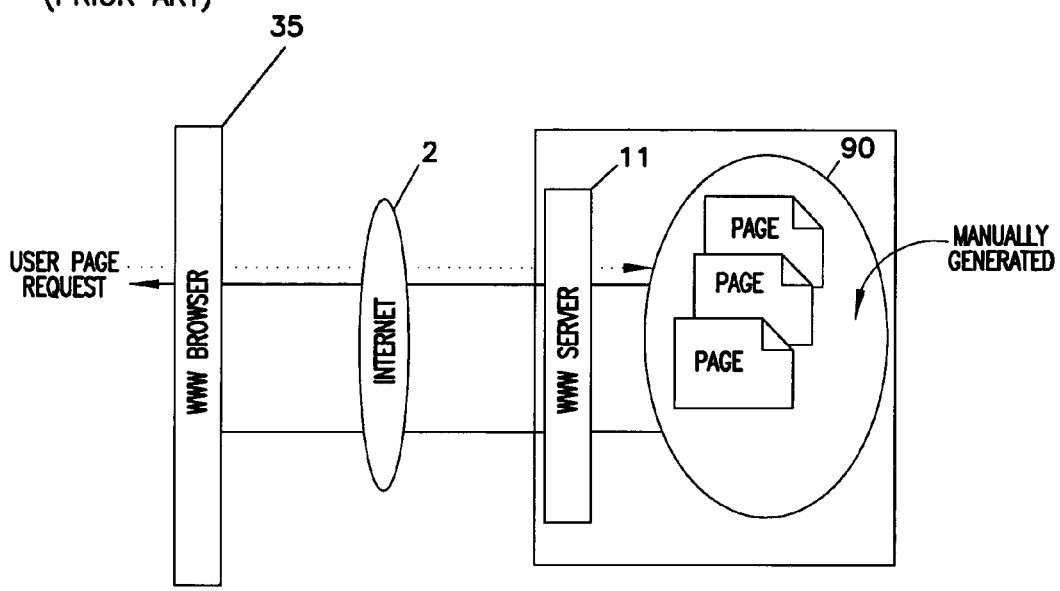
FIG. 1 shows an exemplary conventional access method of the static Web pages.
Figure 2:
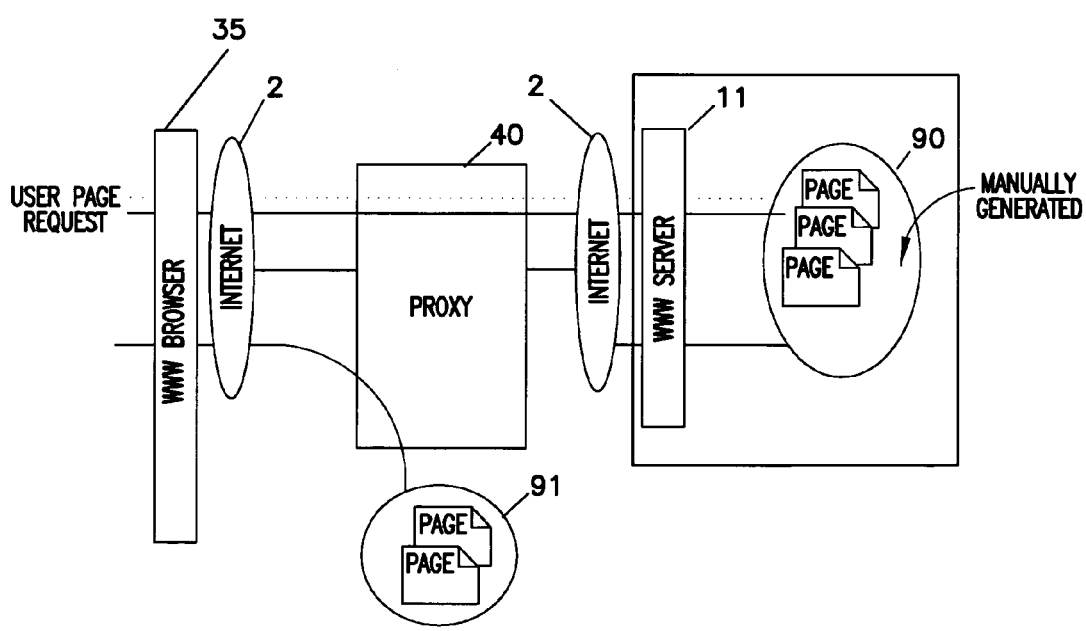
FIG. 2 is another prior art page access technique involving a proxy server.
Figure 3:
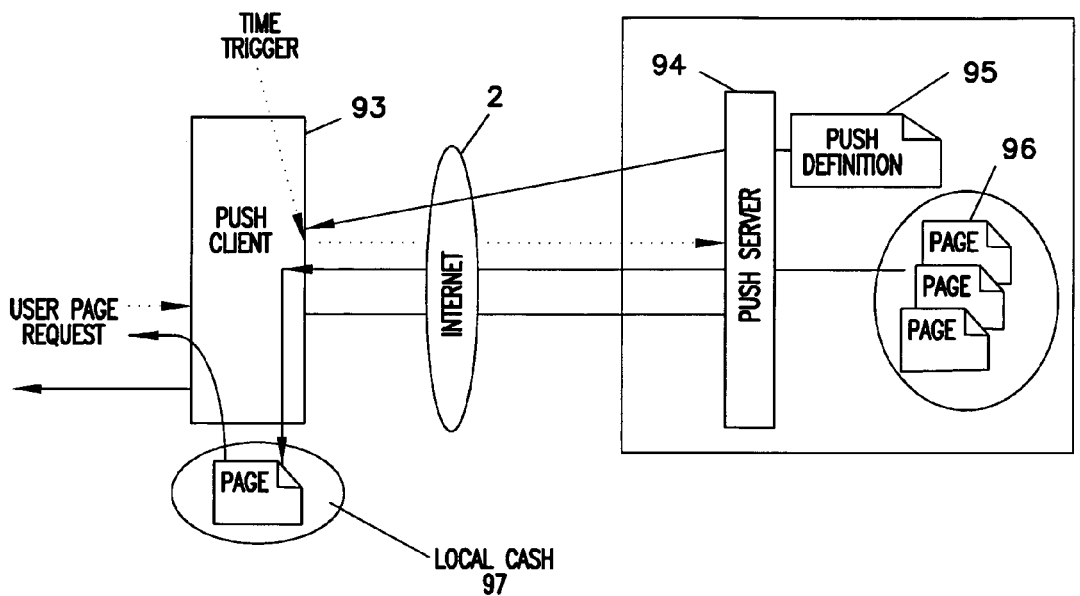
FIG. 3 illustrates a prior art push access technique.
Figure 5:
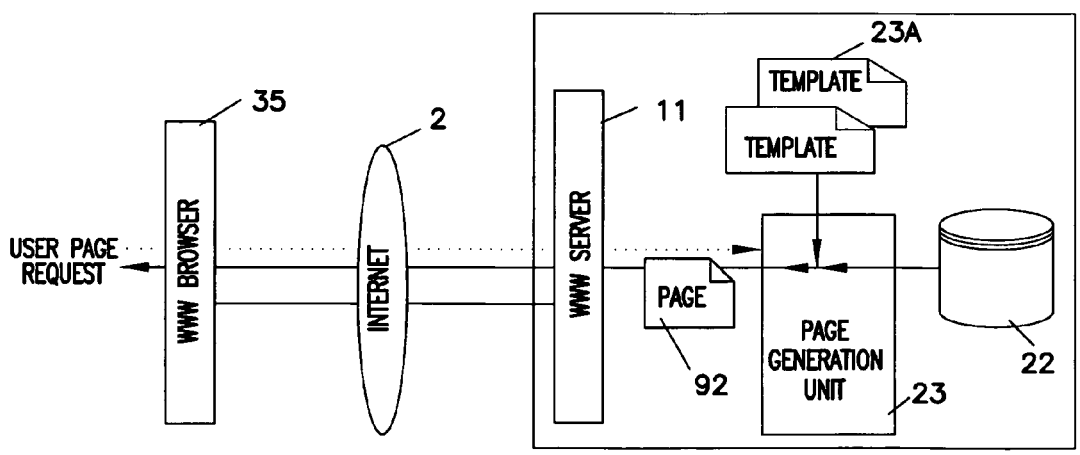
FIG. 5 is a prior art common gate way interface (CGI).
Figure 4:
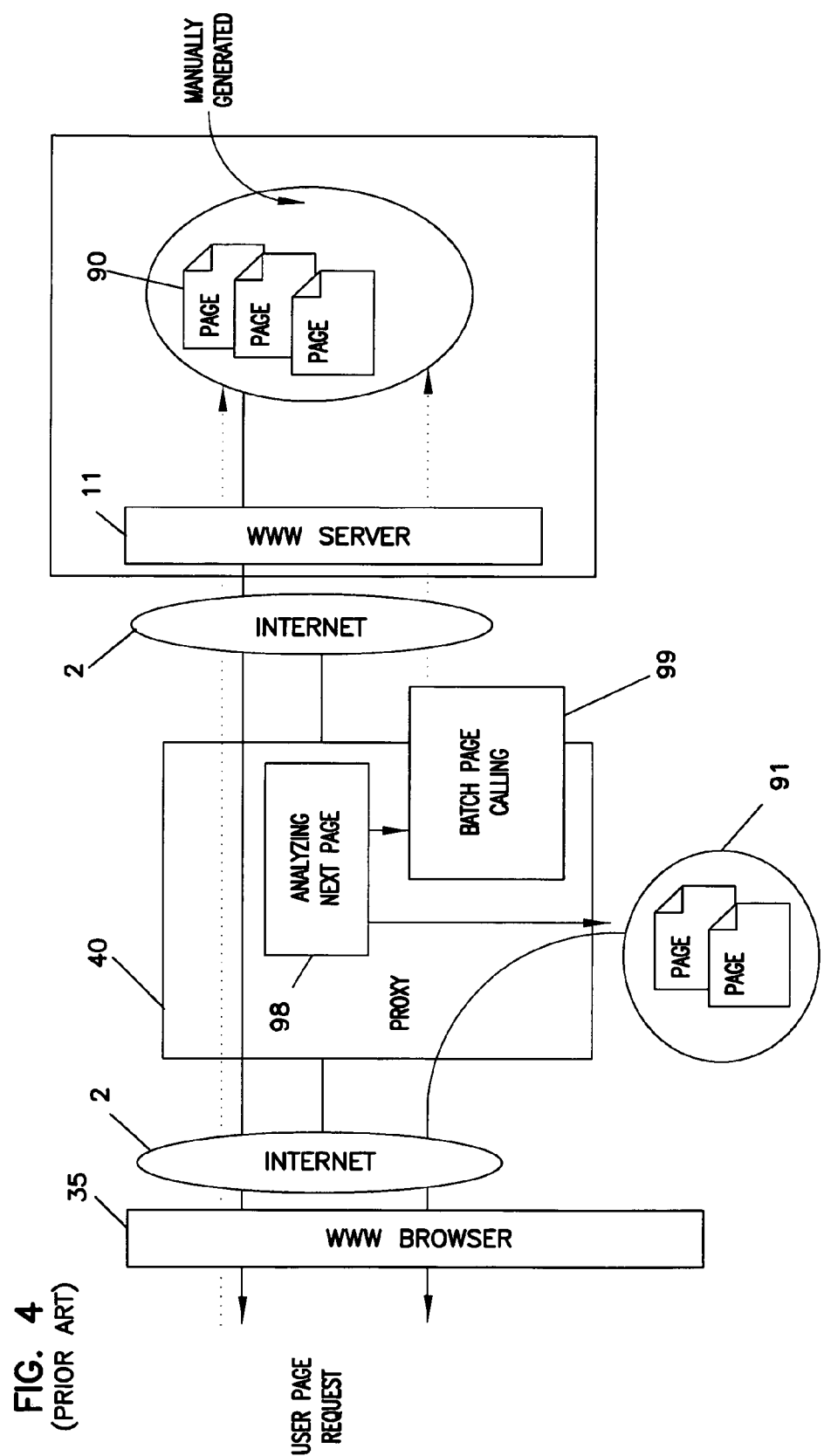
FIG. 4 is yet another prior art example of an efficient page access technique which includes the read-ahead technique.

Using the above described virtual mall example, a comparison was made in efficiency for the page access between the prior art access method as shown in FIG. 5 and the first preferred embodiment according to the current invention as shown in FIG. 7. When the following samples are made:

Sample 1: fifteen data calls in a store catalogue
Sample 2: eight data calls in a focus search page
Sample 3: twenty-five data calls in a product catalogue In the above sample situations, when ten users simultaneously accessed the same data, an amount of time to complete the display of the accessed data was measured. The measured time is shown as follows:

|  | Prior Art | 1st Preferred Embodiment | Efficiency |
| --- | --- | --- | --- |
| Sample 1: | 15 seconds | 3 seconds | 5 times |
| Sample 2: | 40 seconds | 4 seconds | 10 times |
| Sample 3: | 45 seconds | 3 seconds | 15 times |

As shown above, the response time has improved from approximately 2.5 times to approximately 15 times. The dynamic page generation according to the current invention is flexibly performed according to the life of each page. In comparison to unnecessary page generation of the prior art, the page generation time is substantially reduced, and the generated page is efficiently accessed. Since the dynamically generated page is stored in advance, the current invention allows the use of the prior art technologies such as proxy servers in combination to further improve the performance in the cost of transmission of the page information to the user.

In alternative embodiment according to the current invention, in stead of the page generation at the server site, the page generation takes place at a user site. For example, a batch page generation unit or program as well as a batch page generation control unit or program are located at a client PC. By accessing the data and the template at the server, the client generates a new page at the client site before displaying it on the browser. The batch page generation unit or program as well as the batch page generation control unit or program are delivered in an independent medium such as CD-ROM. In an alternative embodiment, in stead of HTML, other languages are used. For example, XML, PostScript, SGML are alternatively used.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of a page generation/access, comprising:
   a) generating a dynamic page based upon a page template and a page generation call with an argument in response to a user page access request including said page generation call with said argument;
   b) storing in a batch page generation definition table a unique file name of said generated dynamic page in association with a page update trigger, said page generation call of said dynamic page, said unique file name containing an element corresponding to said argument;
   c) storing said generated dynamic page in a storage device at a location specified by said unique file name;
   d) updating said generated dynamic page stored in said storage device by generating and storing an updated dynamic page according to said file name stored in said table and based upon said page template and said page generation call with said argument stored in said table in association with said page update trigger in response to at least one of predetermined page update events in advance of another user page access request; and
   e) outputting said stored dynamic page as updated in said step d) and in response to another one of said user page access request, said user page access request, containing a page generation call with an argument stored in said table in association with a file name corresponding to said outputted dynamic page.

2. The method of a page generation/access according to claim 1 wherein said step b) places a command execution result as a character string in the page template, the command execution result being obtained by executing a command in the page template for running an application program based on the argument in the page generation call.

3. The method of a page generation/access according to claim 1 wherein said template further includes immediate executable commands and delayed executable commands, said step b) executing immediate executable commands, said step b) also converting said delayed executable commands into executable commands in said page.

4. The method of a page generation/access according to claim 3 wherein said step d) further comprising: e) executing said converted executable commands in response to said user page access request prior to said outputting.

5. The method of a page generation/access according to claim 4 wherein said step e) optionally incorporates in said page information from said user page access request.

6. The method of a page generation/access according to claim 1 wherein said page update events include a time trigger event, a data update event and a user specified event.

7. The method of a page generation/access according to claim 6 wherein an update flag is initialized to off, in response to said data update event, said update flag is turned on, said step is performed based upon said update flag.

8. The method of a page generation/access according to claim 1 wherein said step a) is repeated between said steps d) and e) if another one of said page update events occurs after said step c).

9. The method of a page generation/access according to claim 1 wherein said page after said step a) is stored in a proxy server.

10. The method of a page generation/access according to claim 1 wherein said steps a), b), c), d), and e) take place at a server site.

11. The method of a page generation/access according to claim 1 wherein said steps a), b), c), d), and e) take place at a client site.

12. A system for generating and accessing a page, comprising:
   a batch page generation control unit for determining a dynamic page to be generated in response to at least one of a predetermined set of page update events;
   a batch page generation unit connected to said batch page generation control unit for generating said dynamic page based upon a page template and a page generation call with an argument in response to a user page access request including said page generation call with said argument;
   a memory unit connected to said batch page generation unit for storing in a batch page generation definition table a unique file name of said generated dynamic page in association with a page update trigger, and said page generation call of said dynamic page; said memory unit storing said generated dynamic page in a storage device at a location specified by said unique file name said batch generation unit updating said generated dynamic page stored in said storage device by generating and storing an updated dynamic page according to said file name stored in said table and based upon said page template and said page generation call with said argument stored in said table in association with said page update trigger in response to at least one of predetermined page update events in advance of another user page access request; and
   an output unit connected to said memory unit for outputting one of said stored dynamic page and said additional dynamic page in response to said user page access request, said user page access request containing a page generation call with an argument stored in said table in association with a file name corresponding to said outputted dynamic page.

13. The system for generating and accessing a page according to claim 12 wherein said page includes data that is formatted by a template, said batch page generating unit generating said page based upon a corresponding pair of the data and the template.

14. The system for generating and accessing a page according to claim 13 wherein said template further includes immediate executable commands and delayed executable commands, said batch page generation unit executing immediate executable commands, said batch page generation unit also converting said delayed executable commands into executable commands in said page.

15. The system for generating and accessing a page according to claim 14 wherein said batch page generation unit further executing said converted executable commands in response to said user page access request prior to outputting.

16. The system for generating and accessing a page according to claim 15 wherein said batch page generation unit optionally incorporates in said page information from said user page access request.

17. The system for generating and accessing a page according to claim 12 wherein said page update events include a time trigger event, a data update event and a user specified event.

18. The system for generating and accessing a page according to claim 17 wherein said batch page generation unit initializes an update flag to off, in response to said data update event, said batch page generation control unit turning said update flag on, said batch page generation unit performs the page generation based upon said update flag.

19. The system for generating and accessing a page according to claim 12 wherein said batch page generation unit repeats the page generation after said memory unit stores said page and said output unit outputs said page if another one of said page update events occurs.

20. The system for generating and accessing a page according to claim 12 wherein said memory unit is located in a proxy server.

21. The system for generating and accessing a page according to claim 12 wherein said batch page generation control unit, said batch page generation unit, said memory unit and said output unit are located at a server site.

22. The system for generating and accessing a page according to claim 12 wherein said batch page generation control unit, said batch page generation unit, said memory unit and said output unit are located at a client site.

23. A method of accessing a Web page, comprising the steps of:
    a) detecting a predetermined Web page generation event;
    b) generating an entire dynamic Web page in response to said predetermined Web page generation event;
    c) storing the dynamically generated entire Web page at a memory location that is referenced by a corresponding one of predetermined unique URL's, the URL's containing an argument for a page generation as a part of the URL's;
    c1) storing in a table a unique file name of said generated dynamic Web page in association with a page update trigger and a page generation call of said dynamic page, said file name containing an element corresponding to said argument;
    c2) requesting a page via a user page access request containing a part of a URL, to be generated;
    d1) determining if the URL matches one of the predetermined URL's;
    d2) updating said generated dynamic page stored in said memory location by generating and storing an updated dynamic Web page according to said file name stored in said table and based upon said page generation call with said argument stored in said table in association with said page update trigger in response to at least one of predetermined page update events in advance of another user page access request; and
    e) accessing the stored dynamically generated entire Web page based upon said step d).

24. The method of accessing a Web page according to claim 23 wherein said step b) further comprising additional steps of:
    speculating the argument for the page generation call to generate the dynamic Web page;
    executing a command in a template of the dynamic Web page with the argument to generate a execution result; and
    placing the execution result in the dynamic Web page.

25. The method of accessing a Web page according to claim 24 wherein the command includes an immediate executable command and a delayed executable command.

26. The method of accessing a Web page according to claim 25 wherein the delayed executable command is executed in response to said step e).

27. The method of accessing a Web page according to claim 23 wherein said step d) further comprising a step of additionally determining if the dynamically generated Web page requires a further update.

28. The method of accessing a Web page according to claim 23 wherein the predetermined Web page generation event includes a time trigger event, a data update event and a user specified event.

29. The method of accessing a Web page according to claim 23 wherein the dynamically generated Web page is stored in a proxy server in said step c).

30. The method of accessing a Web page according to claim 23 wherein said steps a) through e) take place at a client site.

31. The method of accessing a Web page according to claim 23 wherein said steps a) through e) take place at a server site.

32. A system for accessing a Web page, comprising:
    a batch page generation control unit for detecting a predetermined Web page generation event;
    a batch page generation unit connected to said batch page generation control unit for generating an entire dynamic Web page in response to said predetermined Web page generation event; and
    a memory unit connected to said batch page generation unit for storing in a table a unique file name of said generated dynamic page in association with a page update trigger and a page generation call of said dynamic page said file name containing an element corresponding to said argument and storing the dynamically generated entire Web page at a memory location that is referenced by a corresponding one of predetermined unique URL's, the URL's containing the argument for a page generation as a part of the URL's;
    wherein said batch page generation unit receives a user page access request containing a part of a URL to be generated for updating said generated dynamic page stored in said memory unit by generating and storing an updated dynamic page according to said file name stored in said table and based upon said page generation call with said argument stored in said table in association with said page update trigger in response to at least one of predetermined page update events in advance of another user page access request after said batch page generation control unit determines if the URL matches one of the predetermined URL's and allows access to the stored dynamically generated entire Web page.

33. The system for accessing a Web page according to claim 32 wherein said batch page generation control unit further speculates an argument for a page generation call to generate the dynamic Web page, executes a command in a template of the dynamic Web page with an argument to generate a execution result and places the execution result in the dynamic Web page.

34. The system for accessing a Web page according to claim 33 wherein the command includes an immediate executable command and a delayed executable command.

35. The system for accessing a Web page according to claim 34 wherein the delayed executable command is executed in response to user access.

36. The system for accessing a Web page according to claim 32 wherein said batch page generation control unit further determining if the dynamically generated Web page requires a further update.

37. The system for accessing a Web page according to claim 32 wherein the predetermined Web page generation event includes a time trigger event, a data update event and a user specified event.

38. The system for accessing a Web page according to claim 32 wherein the dynamically generated Web page is stored in said memory unit in a proxy server.

39. The system for accessing a Web page according to claim 32 wherein said batch page generation control unit, said batch page generation unit and said memory unit are located at a client site.

40. The system for accessing a Web page according to claim 32 wherein said batch page generation control unit, said batch page generation unit and said memory unit are located at a server site.

* * * * *